US012565447B2

(12) United States Patent
Gallagher et al.

(10) Patent No.: US 12,565,447 B2
(45) Date of Patent: Mar. 3, 2026

(54) GLASS WITH NANOSCALE SURFACE FEATURES FROM THERMAL POLING AND METHODS FOR FORMING THE SAME

(71) Applicant: CORNING INCORPORATED, Corning, NY (US)

(72) Inventors: Michael Thomas Gallagher, Painted Post, NY (US); Charles Thomas McLaren, Elmira, NY (US); Mardochee Reveil, Alexandria, VA (US); Nicholas James Smith, Port Matilda, PA (US)

(73) Assignee: CORNING INCORPORATED, Corning, NY (US)

( * ) Notice: Subject to any disclaimer, the term of this patent is extended or adjusted under 35 U.S.C. 154(b) by 673 days.

(21) Appl. No.: 17/862,927

(22) Filed: Jul. 12, 2022

(65) Prior Publication Data

US 2023/0041269 A1     Feb. 9, 2023

Related U.S. Application Data

(60) Provisional application No. 63/223,325, filed on Jul. 19, 2021.

(51) Int. Cl.
  B32B 15/04        (2006.01)
  B32B 17/06        (2006.01)
  (Continued)

(52) U.S. Cl.
  CPC .............. *C03C 23/009* (2013.01); *C03C 4/18* (2013.01); *C03C 21/002* (2013.01); *C03C 2204/08* (2013.01)

(58) Field of Classification Search
  CPC .................................................. C03C 23/009
  (Continued)

(56) References Cited

U.S. PATENT DOCUMENTS 3,486,995 A    12/1969  Manfred
3,811,855 A  *  5/1974  Carlson ................... H01J 29/24
                                                          422/186.05
(Continued)

FOREIGN PATENT DOCUMENTS

AU          658031 B2      3/1995
EP          0548388 A1     6/1993
                (Continued)

OTHER PUBLICATIONS

K. M. Knowles, et al., "Anodic bonding", International Materials Reviews, vol. 51, Issue 5, 2006, pp. 273-311.
(Continued)

*Primary Examiner* — Lauren R Colgan

(57)          ABSTRACT

A glass substrate with modified surface regions is disclosed. The glass substrate includes a first side and an opposite second side, an alkali-containing bulk disposed between the first and second sides, and a first alkali-depleted region formed in the alkali-containing bulk on the first side. The first alkali-depleted region defines at least a portion of a first topographical feature. The first topographic feature includes a height that extends in a first direction from a base portion of the first topographical feature to an outermost portion of the first topographical feature. The first direction is oriented parallel to a thickness of the glass substrate between the first and second sides. The first topographic feature also includes a width that extends in a second direction between at least two, spaced apart wall portions of the first topographical feature. The second direction is oriented normal to the first direction.

17 Claims, 16 Drawing Sheets

(51) Int. Cl.

| | |
|---|---|
| *C03C 4/18* | (2006.01) |
| *C03C 21/00* | (2006.01) |
| *C03C 23/00* | (2006.01) |

(58) Field of Classification Search

USPC ........................................................ 428/410

See application file for complete search history.

(56) References Cited

U.S. PATENT DOCUMENTS

| | | | |
|---|---|---|---|
| 5,004,707 A | | 4/1991 | Ross et al. |
| 9,651,720 B2 * | | 5/2017 | Lander .................. G02B 5/0226 |
| 9,880,328 B2 * | | 1/2018 | Gollier ................. G02B 5/0278 |
| 10,472,271 B2 * | | 11/2019 | Dutta ...................... C03C 3/083 |
| 10,640,417 B2 * | | 5/2020 | Smith ................... C03C 23/009 |
| 10,800,141 B2 | | 10/2020 | Bartlow et al. |
| 2005/0058423 A1 | | 3/2005 | Brinkmann et al. |
| 2011/0199687 A1 | | 8/2011 | Sellier et al. |
| 2012/0027399 A1 | | 2/2012 | Yeates |
| 2012/0052271 A1 | | 3/2012 | Gomez et al. |
| 2014/0120311 A1 * | | 5/2014 | Smith ..................... C03C 19/00 |
| | | | 428/141 |
| 2015/0111040 A1 * | | 4/2015 | Funatsu ............... C03C 23/006 |
| | | | 65/30.13 |
| 2015/0166407 A1 | | 6/2015 | Varshneya et al. |
| 2015/0174625 A1 * | | 6/2015 | Hart ......................... G06F 3/041 |
| | | | 428/141 |
| 2016/0137548 A1 * | | 5/2016 | Cabral, Jr. .............. C03C 17/06 |
| | | | 65/36 |
| 2016/0137549 A1 | | 5/2016 | Meiss et al. |
| 2016/0159684 A1 * | | 6/2016 | Smith .................. C03C 23/009 |
| | | | 428/141 |
| 2016/0340226 A1 * | | 11/2016 | Dutta .................... C03C 23/009 |
| 2017/0285227 A1 * | | 10/2017 | Chen ........................ G02B 1/12 |
| 2017/0305787 A1 * | | 10/2017 | Gomez ................ C03C 21/002 |

| | | | |
|---|---|---|---|
| 2018/0128957 A1 * | | 5/2018 | Davis .................. C03C 23/0075 |
| 2019/0308394 A1 | | 10/2019 | Alkemper et al. |
| 2020/0199018 A1 | | 6/2020 | Davis et al. |
| 2020/0317559 A1 | | 10/2020 | Fan et al. |
| 2020/0379143 A1 * | | 12/2020 | Gu ........................ G02B 5/1814 |
| 2021/0135158 A1 | | 5/2021 | Min |
| 2021/0238086 A1 | | 8/2021 | Drewnowski et al. |
| 2021/0395137 A1 * | | 12/2021 | Dutta .................. C03C 10/0009 |
| 2021/0395142 A1 * | | 12/2021 | Dutta .................... C03C 23/008 |
| 2022/0380253 A1 * | | 12/2022 | Dimond ............... C03C 23/009 |
| 2023/0024221 A1 * | | 1/2023 | Cushman ............. C03C 21/003 |

FOREIGN PATENT DOCUMENTS

| | | |
|---|---|---|
| EP | 3263535 A1 | 1/2018 |
| FR | 2929415 A1 | 10/2009 |
| WO | 2013/191164 A1 | 12/2013 |
| WO | 2016/187266 A1 | 11/2016 |

OTHER PUBLICATIONS

Luo, et al., "Thermal Poling of Soda-Lime Silica Glass With Non-Blocking Electrodes-Part 1: Effects of Sodium Ion Migration and Water Ingress on Glass Surface Structure", J. Am. Ceram. Soc., vol. 99, No. 4, 2016, pp. 1221-1230.

M. Despont, et al., "Fabrication of a silicon-Pyrex-silicon stack by a.c. anodic bonding", Sensors and Actuators A, vol. 55, 1996, pp. 219-224.

Smith N., et al., "Structure and composition of surface depletion layers in poled aluminosilicate glasses", J Am Ceram Soc., Feb. 2019, vol. 102, pp. 3037-3062.

Tervone, A., et al., "Ion-exchanged glass waveguide technology: a review", Optical Engineering, Jul. 2011, vol. 50, No. 7, 071107, pp. 17.

* cited by examiner

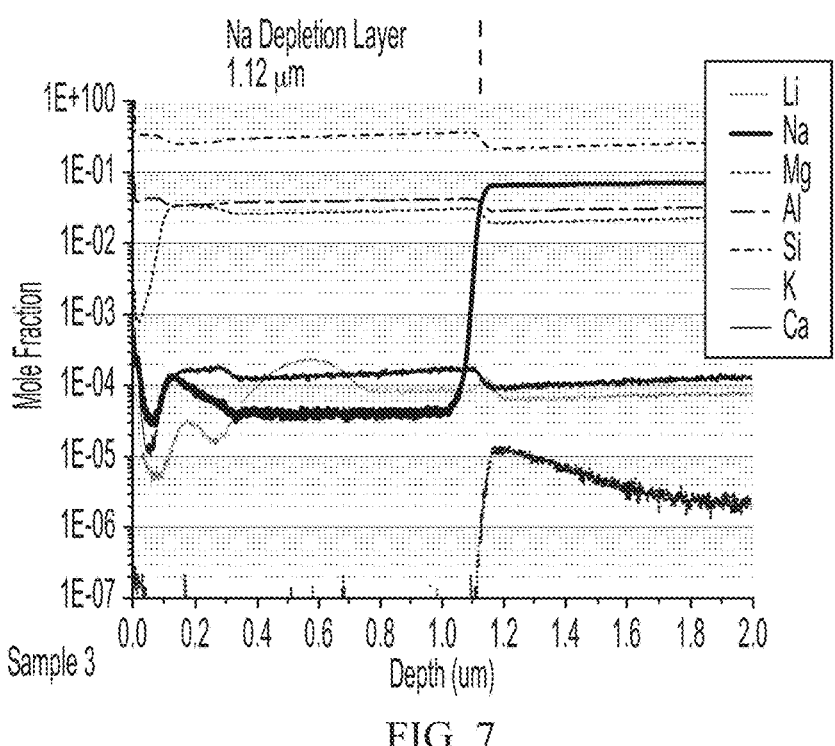

FIG. 7

Data: ☐ sample 1 spot 1 (Snapshot)
| Open | Save | Info. | Set Ranges |

Model: ☐ sample 1 spot 1-bs-fit02 (Snapshot)
| Open | Save | Clear |

Fit:
| Generate | Fit | Fit Scan Data | Reset |

MSE = 6.231
Thickness # 1 = 1192.06±0.590 nm

Layer Commands: Add Delete Save include Surface Roughness = ☐OFF☐

+ | Layer # 1 = B=Spline Thickness # 1 = 1192.06 nm (fit) |
  | Substrate = ☐ control Bspline |

+ MODEL Options
+ FIT Options
+ OTHER Options
  Configure Options
  Turn Off All Fit Parameters

FIG. 8A

Include Surface Roughness = ON Roughness = 4.51 nm (fit)

Layer # 1 = B-Spline Thickness # 1 = 19.20 nm (fit)
　　Init. values: n = 1.500 k = 0.00 Starting Mat = none
　　Resolution (eV) = 0.300 20 Pts. (0.735-6.462 eV) Draw Node Graph
　　Fit Opt. Const. = ON
　　Use KK Mode = OFF
　　　　Query remote system for Opt. Const. = OFF
　　Show Advanced Options = OFF Substrate = Dots Run 1 Unpoled

710

710

GLASS WITH NANOSCALE SURFACE FEATURES FROM THERMAL POLING AND METHODS FOR FORMING THE SAME

CROSS-REFERENCE TO RELATED APPLICATIONS

This application claims the benefit of priority under 35 U.S.C. § 119 of U.S. Provisional Application Ser. No. 63/223,325, filed on Jul. 19, 2021, the content of which is relied upon and incorporated herein by reference in its entirety.

FIELD

The disclosure relates to electro-thermal surface treatment of glass substrates and, more particularly, to methods and systems for forming modified surface regions and corresponding topographical features on opposite sides of glass substrates via electro-thermal poling and field-assisted ion exchange, and to glass substrates having modified surface regions and corresponding topographical features on opposite sides.

BACKGROUND

Various techniques are used to modify the surfaces of glasses. One such technique is electro-thermal poling or simply thermal poling. Thermal poling is a glass surface processing technique in which electric fields are used to induce ionic migrations through the glass at moderated temperatures, which are typically below the glass transition temperature ($T_g$). Existing thermal poling techniques use direct current (DC) electric fields applied in a fixed direction from anode to cathode across the thickness of a glass article to induce ionic migration through glass materials that have a composition containing network-modifying ions. The predominant effect of conventional thermal poling is the formation of a glass network modifying depletion region within the glass nearest the positive electrode. This region is typically devoid of alkali ions, which have migrated towards the negative electrode, and is commonly referred to as the alkali ion depletion layer. Depending on the electrode configuration, the glass proximate to the negative electrode generally experiences little to no change in composition.

The alkali ion depletion layer has a modified composition compared to the bulk composition of the glass. Due to the depletion of mobile alkali ions that were originally present in the unmodified "parent" glass, the alkali ion depletion layer typically has a decreased refractive index relative to that of the parent glass. Such index contrast may be useful for some optical designs. One limitation with existing thermal poling techniques that use DC electric fields in a fixed direction to induce ionic migration through the glass is the characteristically asymmetrical nature of the process. Specifically, conventional DC thermal poling only modifies the glass composition on the anode side of the glass. Additionally, some optical designs may require a level of refractive index contrast that cannot be achieved by thermal poling alone.

Accordingly, it would be desirable implement electric field-induced ion migration/exchange via multiple mechanisms to achieve surface domains with corresponding topographical features on opposite sides of the glass. Such an approach can be used to impart spatially-varied properties in the glass to enhance contrast, such as refractive index contrast, for optical designs. It would be further advantageous to impart such properties in the glass simultaneously or near-simultaneously in one or both surfaces in a single process step.

SUMMARY

An aspect of this disclosure pertains to a glass substrate that includes a first side, an opposite second side, an alkali-containing bulk, and a first alkali-depleted region. The alkali-containing bulk is disposed between the first side and the second side. The first alkali-depleted regions is formed in the alkali-containing bulk on the first side. The first alkali-depleted region defines a portion of a first topographical feature. The first topographical feature includes a height and a width. The height extends in a first direction from a base portion of the first topographical feature to an outermost portion of the first topographical feature. The first direction is oriented parallel to a thickness of the glass substrate between the first and second sides. The width extends in a second direction between at least two, spaced apart wall portions of the first topographical feature. The second direction is oriented normal to the first direction.

The aspects disclosed herein provide unique properties and many advantages. The nature of co-patterning both high- and low-index enables structures for improved optical functionality in a glass article. The nature of patterning modified composition also allows for differential etching to enhance/tune topography. Such differential etching enables advantageous articles in which both refractive indices and topography can be optimally engineered.

In embodiments, higher index contrast is provided. Some optical designs utilize contrast in refractive index to manipulate light as opposed to the absolute value of refractive index. An advantage of the aspects provided herein is that the induced optical index properties of the pattern-poled domains diverge in direction (higher- versus lower-than-initial).

In embodiments, process cost-savings are realized. Because of simultaneous patterning of both high-index and low-index regions with a patterned template, the number of process steps to achieve a desired optical functionality in a glass article is reduced. This reduction in processing burden is especially pronounced relative to many other complex processes to achieve deterministic surface patterns/designs.

In embodiments, durability is realized. Due to the physics of surface treatment according to the aspects disclosed herein, the patterns/features are imprinted into and become an intimate/integral part of the glass substrate. As such, the resulting glass article has the advantage of being durable and hard. Additionally, the changes in glass composition and optical properties are also essentially permanent at room temperature.

BRIEF DESCRIPTION OF THE DRAWINGS

FIG. 7 shows secondary-ion-mass-spectrometry (SIMS) depth profiles for certain elements through an alkali-depleted surface region of a first glass sample of Example 1 after a surface treatment process;

FIGS. 8A-8C present graphical data illustrating the lower refractive index of the alkali-depleted surface region of FIG. 7 compared to the refractive index of a bulk of the first glass sample of Example 1 as measured by spectroscopic ellipsometry;

DETAILED DESCRIPTION

Figure 1:
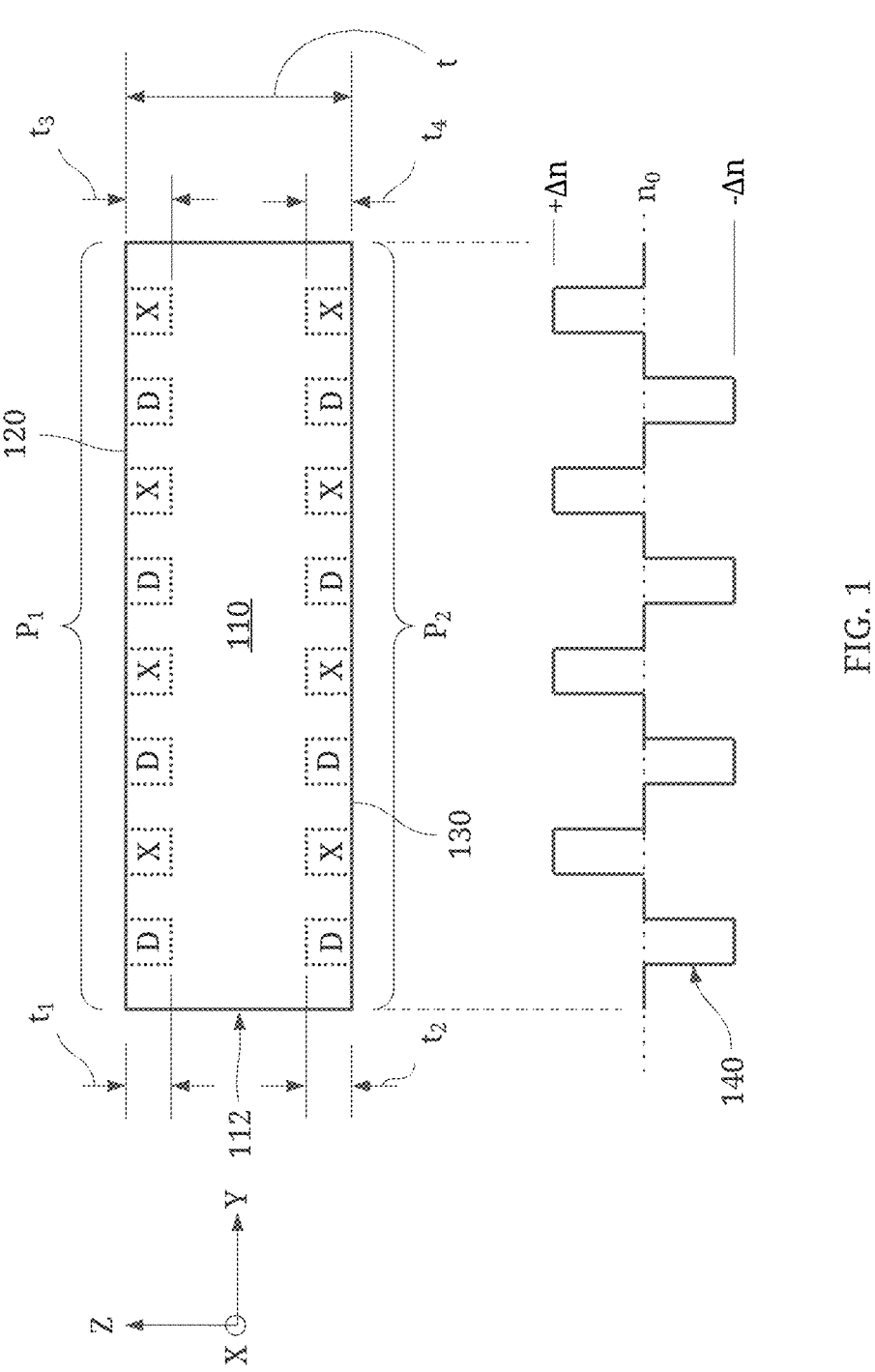
FIG. 1 is a side view of a glass substrate with modified surface regions arranged in at least one surface according to embodiments, the modified surface regions defining a refractive index profile.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein, unless defined elsewhere in association with specific terms or phrases, are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms, such as up, down, right, left, front, back, top, bottom, above, below, and the like, are made only with reference to the figures as drawn and are not intended to imply absolute orientation.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, "alkali" means one or more alkali metals and alkaline earth metals and/or oxides thereof and, specifically, the alkali metals and alkaline earth metals and/or oxides thereof present in a substrate. The terms "mobile ion(s)" and "mobile metal ion(s)" are synonymous with the term "alkali." As used herein, "alkali-depleted," used with reference to a volumetric region of a substrate, means the alkali-depleted region comprises alkali in a concentration that is less than a concentration present in an alkali-containing bulk (or remainder) of the substrate. In some embodiments, the concentration of alkali in the alkali-depleted region is about 0.5 atomic % or less. In such embodiments, in which the alkali concentration is about 0.5 atomic % or less (e.g., about 0.4 atomic % or less, about 0.3 atomic % or less, about 0.2 atomic % or less, about 0.1 atomic % or less, or about 0.05 atomic % or less, or in the range from about 0.05 atomic % to about 0.1 atomic %), the region can be referred to as substantially alkali-free. Where the alkali concentration is less than about 0.05 atomic % or less, the region can be referred to as alkali-free.

As used herein, "ion-exchanged," used with reference to a volumetric region of a substrate, means the ion-exchanged region comprises a composition that is substantially similar to a composition and/or network of the alkali-containing bulk except that certain alkali or mobile metal ions once present in the region ("exchangeable mobile metal ions") have been exchanged for different mobile metal ions ("exchanged mobile metal ions") from a source. The source in embodiments is an external source, such as one or more electrodes that store the exchanged mobile metal ions for exchange into the alkali-containing bulk. The exchanged mobile metal ions in embodiments are different than the exchangeable mobile metal ions so as to bring about an intended change in a property or attribute of the composition after the exchanged mobile metal ions are incorporated into the composition. For example, the exchanged mobile metal ions can be selected to bring about a change in the refractive index in the ion-exchanged region relative to the alkali-containing bulk. The exchanged mobile metal ions in embodiments can be volumetrically larger or smaller than the exchangeable mobile metal ions. The phrase "substantially similar" used with reference to a compositional comparison including the ion-exchanged region means the proportion of each element (atom %) or each oxide (mol %) within the ion-exchanged region and the proportion of each element (atom %) or each oxide (mol %) within the bulk, excluding the exchangeable mobile metal ions and the exchanged mobile metal ions, vary by less than 2%, or vary by less than 1.5%, 1%, 0.75%, 0.5%, 0.25%, or 0.1%, or are approximately equal.

As used herein, "opposite" or "opposing" sides or surfaces of a glass substrate (e.g., a glass article, glass sample, glass laminate, glass sheet, glass ribbon, etc.) means sides or surfaces (or major surfaces) of the glass substrate that face away from one another. In some embodiments, the sides or surfaces (or major surfaces) are substantially planar surfaces and face away from one another by approximately 180° relative to directions normal to the planar surfaces, for example, directions parallel to the Z axis shown in FIG. 1.

As shown in FIG. 1, a first aspect of this disclosure pertains to a glass substrate 110 including an alkali-containing bulk 112, at least one alkali-depleted region D, and at least one ion-exchanged region X. The alkali-depleted region includes a first alkali-depleted region D that extends into the alkali-containing bulk 112 from a first surface 120 of the glass substrate 110. In embodiments, the alkali-depleted region includes a second alkali-depleted region D that extends into the alkali-containing bulk 112 from a second surface 130 of the glass substrate 110. The first surface 120 and the second surface 130 are on opposite sides of the glass substrate 110 in the embodiments shown in the figures. The first alkali-depleted region D and the second alkali-depleted region D can be aligned when viewed in a thickness direction oriented approximately perpendicular to the first and second surfaces 120, 130.

The ion-exchanged region includes a first ion-exchanged region X that extends into the alkali-containing bulk 112 from the first surface 120 of the glass substrate 110. In embodiments, the ion-exchanged region includes a second ion-exchanged region X that extends into the alkali-containing bulk 112 from the second surface 130 of the glass substrate 110. The first ion-exchanged region X and the second ion-exchanged region X can be aligned when viewed in the thickness direction.

In some embodiments, the first alkali-depleted region D or the second alkali-depleted region D can be an alkali-depleted surface layer that extends laterally across an entire extent of the alkali-containing bulk 112, for example, along the Y axis in FIG. 1, and defines the first surface 120 or the second surface 130, respectively. The alkali-depleted surface "layer" possesses and/or exhibits substantially the same or the same features and/or attributes described with respect to an alkali-depleted "region" unless otherwise indicated.

The alkali-containing bulk 112 can include any one or more of alkali-metal oxides selected from $Li_2O$, $Na_2O$, $K_2O$, $Rb_2O$, and $Cs_2O$ and alkaline-earth metal oxides selected from BeO, MgO, CaO, SrO, BaO, and RaO.

The first alkali-depleted region D and the second alkali-depleted region D can be substantially alkali-free or alkali free in embodiments. The first alkali-depleted region D and the second alkali-depleted region D can be described, respectively, as an aluminosilicate region that exhibits a composition that differs from the alkali-containing bulk 112 and concurrently exhibits homogeneity in terms of composition and/or atomic structure within and throughout the region. The first alkali-depleted region D and the second alkali-depleted region D are integral to the glass substrate 110 and are not coatings or additions to the bulk 112.

The first ion-exchanged region X and the second ion-exchanged region X in embodiments include the exchanged mobile metal ions that are exchanged into the glass network of the regions and occupy sites previously occupied by the exchangeable mobile metal ions of the alkali-containing bulk 112. The effect of the exchange on the glass network is essentially to replace the exchangeable mobile metal ions, such as $Na_2O$, with the exchanged mobile metal ions, such as $Ag_2O$ or $K_2O$. The first ion-exchanged region X and the second ion-exchanged region X can be described, respectively, as an aluminosilicate region that exhibits a composition that is substantially similar to the alkali-containing bulk 112 (without regard to the exchangeable and exchanged mobile metal ions) and concurrently exhibits homogeneity in terms of composition and/or atomic structure within and throughout the region. The first ion-exchanged region X and the second ion-exchanged region X are integral to the glass substrate 110 and are not coatings or additions to the bulk 112.

As shown in FIG. 1, the glass substrate 110 can have a substrate thickness t between the first surface 120 and the second surface 130. The first alkali-depleted region D can have a first thickness $t_1$ starting from the first surface 120, and the second alkali-depleted region D can have a second thickness $t_2$ starting from the second surface 130. The first ion-exchanged region X can have a third thickness $t_3$ starting from the first surface 120, and the second ion-exchanged region X can have a fourth thickness $t_4$ starting from the second surface 130. The substrate thickness t, the first thickness $t_1$, the second thickness $t_2$, the third thickness $t_2$, and the fourth thickness $t_4$ can be in the range from about 10 nm to about 10,000 nm, from about 10 nm to about 900 nm, from about 10 nm to about 800 nm, from about 10 nm to about 700 nm, from about 10 nm to about 600 nm, from about 10 nm to about 500 nm, from about 50 nm to about 1000 nm, from about 100 nm to about 1000 nm, from about 200 nm to about 1000 nm, from about 250 nm to about 1000 nm, from about 300 nm to about 1000 nm, from about 400 nm to about 1000 nm, or from about 500 nm to about 1000 nm.

In some embodiments, the substrate thickness t, the first thickness $t_1$, the second thickness $t_2$, the third thickness $t_2$, and the fourth thickness $t_4$ can be in the range from about 0.1 mm to about 3.0 mm (e.g., from about 0.3 mm to about 3 mm, from about 0.4 mm to about 3 mm, from about 0.5 mm to about 3 mm, from about 0.55 mm to about 3 mm, from about 0.7 mm to about 3 mm, from about 1 mm to about 3 mm, from about 0.1 mm to about 2 mm, from about 0.1 mm to about 1.5 mm, from about 0.1 mm to about 1 mm, from about 0.1 mm to about 0.7 mm, from about 0.1 mm to about 0.55 mm, from about 0.1 mm to about 0.5 mm, from about 0.1 mm to about 0.4 mm, from about 0.3 mm to about 0.7 mm, or from about 0.3 mm to about 0.55 mm).

In embodiments, the first thickness $t_1$ of the first alkali-depleted region D and the second thickness $t_2$ of the second alkali-depleted region D are less than the substrate thickness t. The first thickness $t_1$ and the second thickness $t_2$ in embodiments can be about the same such that the glass substrate 110 is symmetrical with respect to the first thickness $t_1$ and the second thickness $t_2$ about a symmetry plane passing through the glass substrate 110. As used herein, a "symmetry plane" is a plane oriented substantially normal to the substrate thickness t and positioned at approximately one half the substrate thickness. The first thickness $t_1$ and the second thickness $t_2$ in embodiments can be different such that the glass substrate 110 is asymmetrical with respect to the first thickness $t_1$ and the second thickness $t_2$ about the symmetry plane SP. In embodiments in which the first thickness $t_1$ and the second thickness $t_2$ are different, the first thickness $t_1$ can be larger than the second thickness $t_2$, or the second thickness $t_2$ can be larger than the first thickness $t_1$.

In embodiments, the third thickness $t_3$ of the first ion-exchanged region X and the fourth thickness $t_4$ of the second ion-exchanged region X are less than the substrate thickness t. The third thickness $t_3$ and the fourth thickness $t_4$ in embodiments can be about the same such that the glass substrate 110 is symmetrical with respect to the third thickness $t_3$ and the fourth thickness $t_4$ about the symmetry plane. The third thickness $t_3$ and the fourth thickness $t_4$ in embodiments can be different such that the glass substrate 110 is asymmetrical with respect to the third thickness $t_3$ and the fourth thickness $t_4$ about the symmetry plane SP. In embodiments in which the third thickness $t_3$ and the fourth thickness $t_4$ are different, the third thickness $t_3$ can be larger than the fourth thickness $t_4$, or the fourth thickness $t_4$ can be larger than the third thickness $t_3$. In some embodiments, the first thickness $t_1$ and the third thickness $t_3$ can be about the same, or the first thickness $t_1$ and the third thickness $t_3$ can be different. Similarly, the second thickness $t_2$ and the fourth thickness $t_4$ in embodiments can be about the same, or the second thickness $t_2$ and the fourth thickness $t_4$ can be different.

The first alkali-depleted region D and the second alkali-depleted region D each have a substantially homogenous composition in embodiments. As used herein, the phrase "substantially homogeneous composition" refers to a composition that does not exhibit any phase separation or very little phase separation and/or does not include portions with a composition differing from other portions. In embodiments, the composition of the first alkali-depleted region D is substantially the same along the first thickness $t_1$, and the composition of the second alkali-depleted region D is substantially the same along the second thickness $t_2$. In other embodiments, the composition of the first alkali-depleted region D is substantially the same along its entire volume, and the composition of the second alkali-depleted region D is substantially the same along its entire volume. Further compositional attributes applicable to the first alkali-depleted region D and the second alkali-depleted region D are described in U.S. Pat. No. 10,472,271, issued Nov. 12, 2019, which is hereby incorporated by reference in its entirety as if fully set forth herein.

In embodiments, the first ion-exchanged region X and the second ion-exchanged region X each have a substantially homogenous composition. In some embodiments, the composition of the first ion-exchanged region X is substantially the same along the third thickness $t_3$, and the composition of the second ion-exchanged region X is substantially the same along the fourth thickness $t_4$. In other embodiments, the composition of the first ion-exchanged region X is substantially the same along its entire volume, and the composition of the second ion-exchanged region X is substantially the same along its entire volume.

In embodiments, such as shown in FIG. 1, the first alkali-depleted region includes a plurality of first alkali-depleted regions D that are spaced apart from one another and extend into the alkali-containing bulk 112 from the first surface 120. In embodiments, such as shown in FIG. 1, the second alkali-depleted region includes a plurality of second alkali-depleted regions D that are spaced apart from one another and extend into the alkali-containing bulk 112 from the second surface 130. The first alkali-depleted regions D can be spaced apart from one another in any lateral direction, for example, any direction lying within the XY plane shown in FIG. 1. The second alkali-depleted regions D can be similarly spaced apart from one another in any lateral direction lying within the XY plane. The first alkali-depleted regions D and/or the second alkali-depleted regions D can be spaced apart from other alkali-depleted regions with a nonzero lateral spacing such that a portion of the alkali-containing bulk 112 separates adjacent (but spaced apart) pairs of the alkali-depleted regions D. The nonzero lateral spacing between the first alkali-depleted regions D and/or the second alkali-depleted regions D in embodiments is at least about 0.01 μm, 0.05 μm, 0.1 μm, 0.5 μm, 0.75 μm, 1 μm, 5, μm, or 10 μm. In embodiments, each first alkali-depleted region of the plurality of first alkali-depleted regions D is substantially aligned with one second alkali-depleted region D of the plurality of second alkali-depleted regions D when viewed in the thickness direction.

In embodiments, such as shown in FIG. 1, the first ion-exchanged region includes a plurality of first ion-exchanged regions X that are spaced apart from one another and extend into the alkali-containing bulk 112 from the first surface 120. In embodiments, such as shown in FIG. 1, the second ion-exchanged region is a plurality of second ion-exchanged regions X that are spaced apart from one another and extend into the alkali-containing bulk 112 from the second surface 130. The first ion-exchanged regions X can be spaced apart from one another in any lateral direction, for example, any direction lying within the XY plane shown in FIG. 1. The second ion-exchanged regions X can be similarly spaced apart from one another in any lateral direction lying within the XY plane. The first ion-exchanged regions X and/or the second ion-exchanged regions X can have a nonzero lateral spacing that is the same as or different than the nonzero lateral spacing of the first alkali-depleted regions D and/or the second alkali-depleted regions D. In some embodiments, each first ion-exchanged region of the plurality of first ion-exchanged regions X is substantially aligned with one second ion-exchanged region of the plurality of second ion-exchanged regions X when viewed in the thickness direction.

The first alkali-depleted regions D and the second alkali-depleted regions D (collectively, "opposing alkali-depleted regions D") can each have a cross-sectional shape when viewed in a section plane oriented normal to the thickness direction (i.e., the XY plane in FIG. 1) and passing through the regions. The cross-sectional shape can have any closed geometry. According to various aspects, the cross-section shape can have a shape chosen from circles, squares, rectangles, diamonds, triangles, hexagons, and other polygons, to name a few. The cross-sectional shape can have any size without limitation. In some embodiments, the size of the cross-sectional shape remains constant along the thickness direction over the thicknesses $t_1$, $t_2$ of the opposing alkali-depleted regions D. In other embodiments, the size of the cross-sectional shape can vary along the thickness direction.

The first ion-exchanged regions X and the second ion-exchanged regions X (collectively, "opposing ion-exchanged regions X") can each have a cross-sectional shape chosen and sized in a manner similar to the cross-sectional shape of the opposing alkali-depleted regions D. In some embodiments, the size of the cross-sectional shape remains constant along the thickness direction over the thicknesses $t_3$, $t_4$ of the opposing ion-exchanged regions X. In other embodiments, the size of the cross-sectional shape can vary along the thickness direction.

The first alkali-depleted regions D and the first ion-exchanged regions X define a first pattern $P_1$ on the first surface 120. The first pattern $P_1$ in some embodiments is a regular, repeating, or periodic pattern; an engineered, designed, or hierarchical pattern; an irregular, random, pseudo-random, or aperiodic pattern; or any combination thereof. As shown in FIG. 1, the first pattern $P_1$ is a repeating pattern in which the first alkali-depleted regions D and the first ion-exchanged regions X alternate across the first surface 120 of the glass substrate 110, for example, along the Y axis.

The second alkali-depleted regions D and the second ion-exchanged regions X define a second pattern $P_2$ on the second surface 130. The second pattern $P_2$ in some embodiments is a regular, repeating, or periodic pattern; an engineered, designed, or hierarchical pattern; an irregular, random, pseudo-random, or aperiodic pattern; or any combination thereof. As shown in FIG. 1, the second pattern $P_2$ is a repeating pattern in which the second alkali-depleted regions D and the second ion-exchanged regions X alternate across the second surface 130 of the glass substrate 110, for example, along the Y axis.

The first alkali-depleted regions D and the first ion-exchanged regions X can have any lateral spacing therebetween. In embodiments, such as shown in FIG. 1, the first alkali-depleted regions D and the first ion-exchanged regions X alternate with a nonzero lateral spacing such that a portion of the alkali-containing bulk 112 separates adjacent (but spaced apart) pairs of the first alkali-depleted regions D and the first ion-exchanged regions X in any lateral direction. The nonzero lateral spacing between the first alkali-depleted regions D and the first ion-exchanged regions X in embodiments is at least about 0.01 μm, 0.05 μm, 0.1 μm, 0.5 μm, 0.75 μm, 1 μm, 5, μm, or 10 μm. The first pattern $P_1$ across the first surface 120 in the embodiment of FIG. 1 (listing only the reference characters for the bulk portions, the alkali-depleted regions, and the ion-exchanged regions for simplicity) includes: 112, D, 112, X, 112, D, 112, X, 112, D, 112, X, 112, D, 112, X, 112. It will be appreciated that the first pattern $P_1$ can have any sequence of the alkali-containing bulk (portions) 112, the first alkali-depleted regions D, and/or the first ion-exchanged regions X.

Additionally, or alternatively, the second alkali-depleted regions D and the second ion-exchanged regions X can have any lateral spacing therebetween. As shown in FIG. 1, the second alkali-depleted regions D and the second ion-exchanged regions X alternate with a nonzero lateral spacing therebetween such that a portion of the alkali-containing bulk 112 separates adjacent (but spaced apart) pairs of the second alkali-depleted regions D and the second ion-exchanged regions X in any lateral direction. The nonzero lateral spacing between the second alkali-depleted regions D and the second ion-exchanged regions X in embodiments can be the same as or different than the nonzero lateral spacing between the first alkali-depleted regions D and the first ion-exchanged regions X. The second pattern $P_2$ in the embodiment of FIG. 1 is the same as the first pattern $P_1$. It will be appreciated that the second pattern $P_2$ can have any sequence of the alkali-containing bulk (portions) 112, the second alkali-depleted regions D, and/or the second ion-exchanged regions X.

The opposing alkali-depleted regions D and opposing ion-exchanged regions X on both sides of the glass substrate 110 are formed simultaneously and/or near-simultaneously using a surface treatment process that includes both thermal poling (TP) mechanisms and field-assisted ion exchange (FAIX) mechanisms (collectively "TP-FAIX surface treatment"). The opposing alkali-depleted regions D are formed via the TP mechanisms, which use electric fields to induce ionic migrations through the glass substrate at moderated temperatures. The opposing ion-exchanged regions X are formed via the FAIX mechanisms, which use electric fields to drive or inject mobile metal ions from a source, such as an electrode, into the glass substrate at sites previously occupied by different mobile metal ions of the glass substrate. It will be appreciated that field-assisted ion exchange is distinct from conventional thermal and/or diffusive ion exchange.

The glass substrate 110 prior to TP-FAIX surface treatment and the alkali-containing bulk 112 may include a variety of glass compositions. Such glass compositions used in the glass substrate prior to TP-FAIX surface treatment and present in the alkali-containing bulk 112 after TP-FAIX surface treatment may be referred to herein as a "precursor" glass, a precursor glass composition, or a parent glass. The precursor glass compositions may range from simple alkali or alkaline-earth silicates, aluminosilicates, borosilicates, or boroaluminosilicates, to more complex multicomponent glasses that can form an altered region and/or surface layer by the TP-FAIX surface treatment disclosed herein. Some examples of precursor glass compositions that can be used for the glass substrate 110 and the alkali-containing bulk 112 are provided in U.S. Pat. No. 10,472,271.

The glass substrate 110 after TP-FAIX surface treatment to form the opposing alkali-depleted regions D and the opposing ion-exchanged regions X exhibits several attributes that are changed relative to the same attributes of the precursor glass prior to TP-FAIX surface treatment. One attribute that can be changed after TP-FAIX surface treatment is refractive index. The refractive index (also known as refraction index or index of refraction) of a material is defined as the ratio between the speed of light in a vacuum and the phase velocity of light in the corresponding material.

In embodiments, the first alkali-depleted regions D each comprise a first alkali-depleted (AD) refractive index that is less than a bulk refractive index of the alkali-containing bulk 112. The first AD refractive index is less than the bulk refractive index since the first alkali-depleted regions D are depleted of mobile metal ions that were present initially in the precursor glass and remain in the alkali-containing bulk 112. In embodiments that include the second alkali-depleted regions D, the second alkali-depleted regions D each comprise a second alkali-depleted (AD) refractive index that is less than the bulk refractive index. The first and second AD refractive indices can be approximately the same in some embodiments. In other embodiments, first and second AD refractive indices can be different.

In embodiments, the first ion-exchanged regions X each comprise a first ion-exchanged (IX) refractive index that is greater than the bulk refractive index of the alkali-containing bulk 112. The first IX refractive index is greater than the bulk refractive index since the exchanged mobile metal ions in the first ion-exchanged regions X are different than the exchangeable mobile metal ions that were present initially in the precursor glass and remain in the alkali-containing bulk 112. In embodiments that include the second ion-exchanged regions X, the second ion-exchanged regions X each comprise a second ion-exchanged (IX) refractive index that is greater than the bulk refractive index. The first and second IX refractive indices can be approximately the same in some embodiments. In other embodiments, first and second IX refractive indices can be different.

In embodiments, one or more of the first alkali-depleted regions D, the first ion-exchanged regions X, the second alkali-depleted regions D, and the second ion-exchanged regions X define a refractive index profile 140 across the glass substrate 110 as shown in FIG. 1. The refractive index profile 140 indicates a relative change in refractive index ($\pm\Delta n$) of the glass substrate 110 from a reference refractive index ($n_0$) across the surface(s). The reference refractive index $n_0$ corresponds to the bulk refractive index of the alkali-containing bulk 112. The positive change in refractive index $+\Delta n$ corresponds to the increase in refractive index within the first and second ion-exchanged regions X. The negative change in refractive index $-\Delta n$ corresponds to the decrease in refractive index within the first and second alkali-depleted regions D.

In preferred embodiments, the refractive index profile 140 is defined by at least one first alkali-depleted region D and at least one first ion-exchanged region X positioned proximate to one another such that the refractive index profile 140 indicates refractive indices that diverge in opposite directions relative to the bulk refractive index no. This divergence in the refractive indices enhances refractive index contrast, which can improve optical properties and/or enable new optical function(s). Additionally, or alternatively, the refractive index profile 140 is defined by at least one second alkali-depleted region D and at least one second ion-exchanged region X positioned proximate to one another. The refractive indices in these second regions D, X similarly diverge in opposite directions relative to the bulk refractive index no to provide enhanced refractive index contrast.

As shown in FIG. 1, the relative changes in refractive index of the glass substrate 110 indicated by the refractive index profile 140 correspond with the first pattern $P_1$ of the first alkali-depleted regions D and the first ion-exchanged regions X and/or with the second pattern $P_2$ of the second alkali-depleted regions D and the second ion-exchanged regions X. For instance, from left to right in FIG. 1, the refractive index profile 140 indicates the following sequence of refractive index changes across the glass substrate 110 with the corresponding portions/regions of the glass substrate 110 indicated parenthetically: $n_0$ (112), $-\Delta n$ (D), $n_0$ (112), $+\Delta n$ (X), $n_0$ (112), $-\Delta n$ (D), $n_0$ (112), $+\Delta n$ (X), $n_0$ (112), $-\Delta n$ (D), $n_0$ (112), $+\Delta n$ (X), $n_0$ (112), $-\Delta n$ (D), $n_0$ (112), $+\Delta n$ (X), $n_0$ (112). It will be appreciated that the refractive index profile 140 can include a multitude of different sequences of refractive index changes across the glass substrate since the refractive index profile 140 corresponds with the first pattern $P_1$ and/or the second pattern $P_2$.

The glass substrate can be substantially planar or sheet-like, although other embodiments may utilize a curved or otherwise shaped or sculpted substrate. The glass substrate can be substantially optically clear, transparent and free from light scattering. In such embodiments, the glass substrate can exhibit an average total transmittance over the optical wavelength regime of about 85% or greater, about 86% or greater, about 87% or greater, about 88% or greater, about 89% or greater, about 90% or greater, about 91% or greater or about 92% or greater.

Additionally, or alternatively, the physical thickness of the glass substrate can vary along one or more of its dimensions for aesthetic and/or functional reasons. For example, the edges of the glass substrate can be thicker as compared to more central regions of the glass substrate. The length, width, and physical thickness dimensions of the glass substrate can also vary according to the application or use.

The glass substrate can be provided by various forming methods, including float glass processes and down-draw processes such as fusion draw and slot draw.

A second aspect of this disclosure pertains to a method of forming a glass substrate with modified surface regions. The method includes providing a glass substrate 110 that has a concentration of first mobile metal ions and opposing surfaces. The opposing surfaces include a first surface 120 and a second surface 130 on approximately opposite sides of the glass substrate 110. The method further includes reducing the concentration of first mobile metal ions in a first region of the first surface via thermal poling and simultaneously, in a second region of the first surface, exchanging the first mobile metal ions for second mobile metal ions via field-assisted ion exchange. The second mobile metal ions are different than the first mobile metal ions. The first region and the second region each have a substantially homogenous composition after thermal poling and field-assisted ion exchange, respectively.

Figure 2:
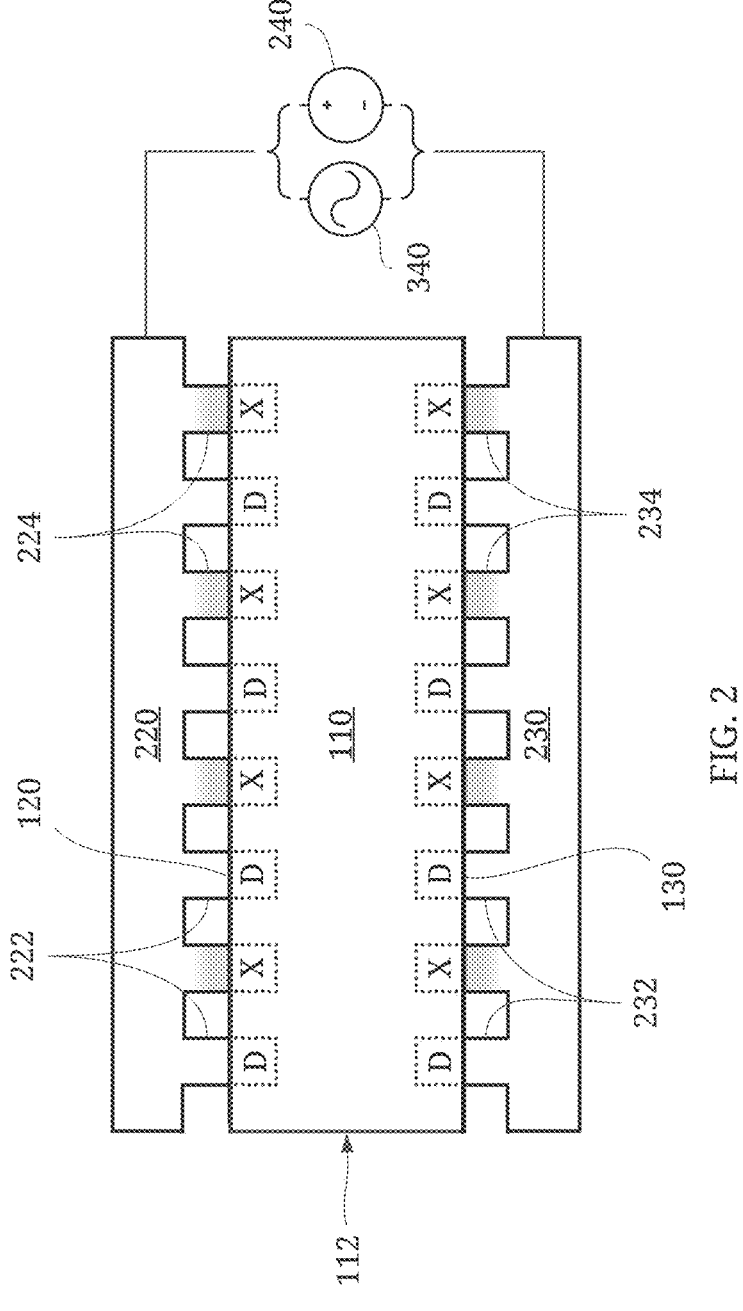
FIG. 2 is a side view of the glass substrate of FIG. 1 during a surface treatment process in which the modified surface regions are formed in the at least one surface according to embodiments.

FIG. 2 is a side view of the modified surface regions formed in at least one surface of the glass substrate 110 of FIG. 1 during TP-FAIX surface treatment using thermal poling and field-assisted ion exchange according the method of the present disclosure. The TP-FAIX surface treatment includes contacting a first electrode 220 to the first surface 120 of the glass substrate 110, contacting a second electrode 230 to the second surface 130 of the glass substrate 110, and applying an electrical potential difference 240, 340 to the glass substrate 110. The electrical potential difference can be a fixed electrical potential difference 240 in some embodiments or an alternating electrical potential difference 340 in other embodiments as described herein.

In embodiments, thermal poling includes contacting a first portion 222 of the first electrode 220 to the first region of the first surface and applying the fixed electrical potential difference 240 to the glass substrate 110 such that the first electrode 220 is positively-biased relative to the glass substrate to induce alkali depletion in the first region. The first region after TP-FAIX surface treatment corresponds to the one or more first alkali-depleted regions D along the first surface 120 shown in FIGS. 1 and 2. In embodiments, field-assisted ion exchange includes contacting a second portion 224 (shown with shading in the figures for clarity) of the first electrode 220 to the second region of the first surface 120 and applying the fixed electrical potential difference 240 to the glass substrate such that the first electrode 220 is positively-biased relative to the glass substrate to induce ion exchange in the second region. The second region after TP-FAIX surface treatment corresponds to the one or more first ion-exchanged regions X along the first surface 120 shown in FIGS. 1 and 2.

In embodiments, the method further includes, near-simultaneously with reducing the concentration of first mobile metal ions in the first region and with exchanging the first mobile metal ions for the second mobile metal ions in the second region, reducing the concentration of first mobile metal ions in a third region of the second surface via thermal poling. In such embodiments, thermal poling includes contacting a third portion 232 of the second electrode 230 to the third region of the second surface 130 and applying an alternating electrical potential difference 340 to the glass substrate 110 such that the first electrode 220 and the second electrode 230 are alternatingly positively-biased relative to the glass substrate to induce alkali depletion in the first region and the third region, respectively, and to induce ion exchange in the second region. The third region after TP-FAIX treatment corresponds to the one more second alkali-depleted regions D along the second surface 130 shown in FIGS. 1 and 2.

In embodiments, the method further includes, near-simultaneously with reducing the concentration of first mobile metal ions in the first region and with exchanging the first mobile metal ions for the second mobile metal ions in the second region and simultaneously with reducing the concentration of first mobile metal ions in the third region, exchanging the first mobile metal ions for the second mobile metal ions in a fourth region of the second surface via field-assisted ion exchange. In such embodiments, field-assisted ion exchange includes contacting a fourth portion 234 (shown with shading in the figures for clarity) of the second electrode 230 to the fourth region of the second surface 130 and applying the alternating electrical potential difference 340 to the glass substrate 110 such that the first electrode 220 and the second electrode 230 are alternatingly positively-biased relative to the glass substrate to induce ion exchange in the second region and the fourth region, respectively, and to induce alkali depletion in the first region and the third region, respectively. The fourth region after TP-FAIX treatment corresponds to the one or more second ion-exchanged regions X along the second surface 130 shown in FIGS. 1 and 2.

The first electrode 220 in embodiments comprises one or more electrode materials that are substantially more conductive than the glass substrate 110 at a treatment temperature to provide field uniformity over the first surface 120. It is also desirable that the first electrode material is relatively oxidation resistant to minimize the formation of an interfacial oxide compound that could cause sticking of the glass substrate 110 to the first electrode 120. The second electrode 230 comprises one or more electrode materials that are likewise substantially more conductive than the glass substrate 110 at the treatment temperature to provide field uniformity over the second surface 130. The second electrode material can be relatively oxidation resistant to minimize the formation of an interfacial oxide compound that could cause sticking of the glass substrate 110 to the second electrode 130.

The first portion 222 of the first electrode 220 can comprise a first portion electrode material that is configured to induce alkali depletion in the first region D of the alkali-containing bulk 112 when the first electrode 220 contacts the first surface 120 of the glass substrate 110 under a positive electrical bias. The first portion electrode material can provide blocking conditions during TP-FAIX treatment. In some embodiments, the blocking conditions are fully blocking conditions, which means no significant supply of ions passes through the surface of the glass substrate at the interface between the glass substrate and electrode during thermal poling. In some embodiments, the blocking conditions are partially blocking conditions in which some ionic species can pass through the interface, such as when hydrogen-related species are the primary species of ingress at the anodic interface. The first portion electrode material in some embodiments is selected from platinum (Pt), carbon (C), stainless steel, or combinations thereof.

The second portion 224 of the first electrode 220 can comprise a second portion electrode material that is configured to induce ion exchange in the second region X of the alkali-containing bulk 112 when the first electrode 220 contacts first surface 120 of the glass substrate 110 under a positive electrical bias. The second portion electrode material is different than the first portion electrode material in embodiments since the first portion electrode material induces surface modification via TP mechanisms and the second portion electrode material induces surface modification via FAIX mechanisms. The second portion electrode material in some embodiments is selected from silver (Ag), potassium (K), or combinations thereof.

In embodiments in which the second electrode 230 is used to modify one or more surface regions of the second surface 130 via TP mechanisms, the third portion 232 of the second electrode 220 can comprise a third portion electrode material. The third portion 232 electrode material in such embodiments is configured to induce alkali depletion in the third region D of the alkali-containing bulk 112 when the second electrode 220 contacts the second surface 130 of the glass substrate 110 under a positive electrical bias. The third portion electrode material in some embodiments is selected from platinum (Pt), carbon (C), stainless steel, or combinations thereof. The third portion electrode material can be the same as or different from the first portion electrode material. The third portion electrode material can provide blocking conditions during TP-FAIX treatment in a similar manner as provided by the first portion electrode material. The use of different electrode materials for the first and third portions 222, 232 can cause the first AD refractive index of the first alkali-depleted regions D to be different from the second AD refractive index of the second alkali-depleted regions D. This difference in refractive index can result from differences in the respective thicknesses of the first and second alkali-depleted regions D after TP-FAIX surface treatment. Similarly, a difference in the extent of blocking (i.e., full versus partial) at the first portions 222 of the first electrode 220 and the second portions 232 of the second electrode 230 can cause a difference between the first and second AD refractive indices. This difference in refractive index can result from the injection of hydrogen from atmospheric $H_2O$ in the surface treatment environment on the side of the substrate with partial blocking conditions.

In embodiments in which the second electrode 230 is used to modify one or more surface regions of the second surface 130 via FAIX mechanisms, the fourth portion 234 of the second electrode 220 can comprise a fourth portion electrode material. The fourth portion electrode material in such embodiments is configured to induce ion exchange in the fourth region X of the alkali-containing bulk 112 when the second electrode 220 contacts the second surface 130 of the glass substrate 110 under a positive electrical bias. The fourth portion electrode material in some embodiments is selected from silver (Ag), potassium (K), or combinations thereof. The fourth portion electrode material can be the same as or different from the second portion electrode material.

The first portion 222 and the second portion 224 of the first electrode 220 each correspond in number, approximate position, and approximate cross-sectional size and shape to the first alkali-depleted regions D and the first ion-exchanged regions X, respectively, when the first electrode 220 is positioned in contact with the first surface 120. In this arrangement, the first portion(s) 222 and the second portion (s) 224 define a first template on the first electrode 220 that corresponds with the first pattern $P_1$ (FIG. 1) on the first surface 120. Similarly, the third portion 232 and the fourth portion 234 of the second electrode 230 each correspond in number, approximate position, and approximate cross-sectional size and shape to the second alkali-depleted regions D and the second ion-exchanged regions X, respectively, when positioned in contact with the second surface 130. In this arrangement, the third portion(s) 232 and the fourth portion (s) 234 define a second template on the second electrode 230 that corresponds with the second pattern $P_2$ (FIG. 1) on the second surface 130.

In embodiments, the first electrode 220 and the second electrode 230 are separate components that are brought into contact with the glass substrate 110, and thus can be separated after processing without complex removal steps. The curvature and/or flatness of the glass substrate 110 and the first electrode 220 should ideally be matched to provide for reasonably intimate contact at the interface over the first surface 120. Similarly, the curvature and/or flatness of the glass substrate 110 and the second electrode 230 should ideally be matched to provide for reasonably intimate contact at the interface over the second surface 130. However, even if initial contact is not intimate, the electrostatic charge at the interface when voltage is applied will tend to pull the surfaces at the interface into intimate contact.

In embodiments in which the first alkali-depleted region or the second alkali-depleted region is an alkali-depleted surface layer, the corresponding first electrode or second electrode is configured to cover substantially all the surface for which it is in contact.

Prior to TP-FAIX surface treatment using thermal poling and field-assisted ion exchange, the first surface 120 and the second surface 130 of the glass substrate 110 can be cleaned or treated to remove typical contamination that can accumulate after forming, storage, and shipping. Alternatively, the glass substrate 110 can be subjected to TP-FAIX surface treatment immediately after glass forming to eliminate the accumulation of contamination.

The glass substrate 110 in embodiments can be subjected to TP-FAIX surface treatment under vacuum, in an inert gas environment (e.g., dry $N_2$), or a permeable gas environment (e.g., He) to provide blocking conditions.

Prior to applying the electrical potential difference 240, 340, the method can include heating the glass substrate 110, the first electrode 220, and the second electrode 230 (e.g., the stack including first electrode/glass substrate/second electrode) to a temperature below the glass transition temperature ($T_g$) of the glass substrate 110. In some embodiments, the glass substrate 110 and the first and second electrodes 220, 230 can be heated to a process temperature in the range from about 25° C. to about $T_g$, from about 50° C. to about 200° C., or from about 100° C. to about 300° C. In some embodiments, equilibrium at the desired process temperature can be useful in thermal poling to ensure temperature uniformity. In some embodiments, the glass substrate 110, the first electrode 220, and the second electrode 230 are heated concurrently together in the stack. In other embodiments, the glass substrate 110, the first electrode 220, and the second electrode 230 can be heated separately and then positioned in the stack for thermal poling.

With continued reference to FIG. 2, TP-FAIX surface treatment in some embodiments can include applying a fixed electrical potential difference 240 to the glass substrate 110 to simultaneously form the modified surface regions D, X at one of the surfaces 120, 130. In such embodiments, the modified surface regions D, X are formed at the surface proximate to the electrode 220, 230 that is positively-biased (i.e., the anode) relative to the glass substrate. The electric potential in such embodiments can be direct current (DC).

In embodiments, the fixed electrical potential difference 240 is applied in the range from about 100 volts to about 10,000 volts (e.g., from about 100 volts to about 1000 volts) to the glass substrate for a duration in the range from about 1 minute to about 6 hours (e.g., from about 5 minutes to about 60 minutes, from about 15 minutes to about 30 minutes). The fixed electric potential 240 can be applied in either one or more discrete steps to achieve a maximum desired value, or ramped (or increased) in a controlled/current-limited manner up to the process voltage.

The TP-FAIX surface treatment in some embodiments can include applying an alternating electrical potential difference 340 to the glass substrate 110 to simultaneously form the modified surface regions D, X on one of the surfaces 120, 130 and to near-simultaneously form the modified surface regions D, X on the other of the surfaces 120, 130. The alternating electrical potential difference 340 is applied using an electrical source (current or voltage) with an alternating waveform that defines a duty cycle for surface treatment of the glass substrate 110. The duty cycle includes a first half-cycle in which the first electrode 220, for example, is positively-biased relative to the glass substrate 110 to induce alkali depletion in the first alkali-depleted regions D and to induce ion exchange in the first ion-exchanged regions X at the first surface 120 of the glass substrate 110. The duty cycle also includes a second half-cycle in which the second electrode 230, for example, is positively-biased relative to the glass substrate 110 to induce alkali depletion in the second alkali-depleted regions D and to induce ion exchange in the second ion-exchanged regions X at the second surface 120 of the glass substrate 110. The duty cycle can then be repeated to achieve the desired surface modification. It will be appreciated that the half-cycles can be reversed in that the second electrode 130 is positively-biased during the first half-cycle and the first electrode 120 is positively biased during the second half-cycle.

In some embodiments, the alternating electrical potential difference 340 is applied to the glass substrate 110 using a time-varying or "pulsed" direct current (DC) waveform. In such embodiments, the duty cycle is configured to split the time between the DC voltage orientation across the glass substrate 110. This repeating duty cycle alters the polarity of the first and second electrodes 220, 230 from anode to cathode in a repeating fashion, effectively generating a square alternating current (AC) waveform.

In some embodiments, the alternating electrical potential difference 340 is applied to the glass substrate 110 using an AC waveform with a repeating duty cycle. One advantage of using an AC waveform is that the waveform can be customized based on the composition of the glass substrate 110 and the desired thicknesses ($t_1$, $t_2$) for the opposing alkali-depleted regions D and the desired thicknesses ($t_3$, $t_4$) for the opposing ion-exchanged regions X. Since the electrical properties of the glass substrate are frequency dependent, the AC waveform can be chosen in a manner that optimizes the dielectric response of the glass. The working frequency range for thermal poling using an AC waveform exists below the frequency independent resistivity regime for DC conduction of glass. This lower frequency range is referred to as electrode polarization regime.

As used herein, the term "near-simultaneously" used in the context of TP-FAIX surface treatment according to the embodiments disclosed herein means the action or mechanism of forming the second alkali-depleted regions D and/or the second ion-exchanged regions X on the second surface 130 commences successively and immediately following the action or mechanism of forming the first alkali-depleted regions D and the first ion-exchanged regions X on the first surface 120. More specifically, when TP-FAIX surface treatment includes applying an alternating electrical potential difference to a glass substrate using a duty cycle, forming the second alkali-depleted regions D and/or the second ion-exchanged regions X on the second side/surface 130 commences successively and immediately following the portion of the duty cycle that applies a positive electrical bias to the first side/surface of the glass substrate.

For example, when TP-FAIX surface treatment includes using an AC waveform configured as a 50/50 duty cycle sinusoidal wave at a working frequency of 1 Hz, the first half-cycle of the 50/50 duty cycle simultaneously forms the first alkali-depleted regions D and the first ion-exchanged regions X on the first surface 120 for about 0.5 seconds while the second half-cycle of the 50/50 duty cycle forms second alkali-depleted regions D and/or the second ion-exchanged regions X on the second surface 130. In this example, the near-simultaneously forming the second alkali-depleted regions D and/or the second ion-exchanged regions X commences about 0.5 seconds after the simultaneously forming the first alkali-depleted regions D and the first ion-exchanged regions X commences and/or successively and immediately following the end of the first half-cycle. Near-simultaneously in some embodiments means about 0.01 s, 0.1 s, 1 s, 5 s, 10 s, 25 s, 50 s, or 100 s. Unless specified in the claims, the enumerated durations attributed to near-simultaneously are not required.

When TP-FAIX surface treatment includes applying the alternating electrical potential difference 340 to the glass substrate 110 using the AC waveform, the modified surface regions D, X are formed on the first and second surfaces 120, 130 without the need to release and/or remove the first and second electrodes 220, 230 from contact with the glass substrate 110 and then reverse their positions since the polarity of the first and second electrodes 220, 230 is reversed electronically according to the disclosed method. Such a surface treatment method improves process efficiency and avoids the need to provide registration methods or features to align the first and second electrodes to the glass substrate 110 for successive surface treatments.

In embodiments, the working frequency range of the AC waveform is from about 0.001 Hz to about 500 Hz, from about 0.001 Hz to about 5 Hz, from about 0.001 Hz to about 2.5 Hz, from about 0.001 Hz to about 1 Hz, from about 0.001 Hz to about 0.9 Hz, from about 0.001 Hz to about 0.8 Hz, from about 0.001 Hz to about 0.7 Hz, from about 0.001 Hz to about 0.6 Hz, from about 0.001 Hz to about 0.5 Hz, from about 0.001 Hz to about 0.4 Hz, from about 0.001 Hz to about 0.3 Hz, from about 0.001 Hz to about 0.2 Hz, from about 0.001 Hz to about 0.1 Hz, from about 0.01 Hz to about 5 Hz, from about 0.01 Hz to about 2.5 Hz, from about 0.01 Hz to about 1 Hz, from about 0.02 Hz to about 1 Hz, from about 0.03 Hz to about 1 Hz, from about 0.04 Hz to about 1 Hz, from about 0.05 Hz to about 1 Hz, from about 0.06 Hz to about 1 Hz, from about 0.07 Hz to about 1 Hz, from about 0.08 Hz to about 1 Hz, from about 0.09 Hz to about 1 Hz, or from about 0.1 Hz to about 1 Hz.

In embodiments, TP-FAIX surface treatment includes applying the alternating electrical potential difference 340 in the range from about 50 volts to about 10,000 volts (e.g., from about 100 volts to about 1,000 volts or from about 200 volts to about 300 volts) to the glass substrate for a duration in the range from about 1 second to about 6 hours (e.g., from about 30 seconds to about 3 hours, from about 1 minute to about 5 minutes, from about 5 minutes to about 60 minutes, from about 15 minutes to about 30 minutes). TP-FAIX surface treatment times and potential can also vary depending the selected working frequency or working frequency range for the repeating duty cycle.

In embodiments using the alternating electrical potential difference 340, the total number of polarity-reversal cycles can be selected to achieve a predetermined level of completeness toward a target steady-state thickness of each of the modified surface regions D, X for a given combination of glass substrate and voltage. The alternating electrical potential difference 340 can include a DC offset towards one side of the glass substrate 110. The use of a DC offset can cause an asymmetry in the internal field, which in turn can result in differences between the first and second alkali-depleted regions D and between the first and second ion-exchanged regions X. For instance, the use of a DC offset can result in a difference between the first AD refractive index of the first alkali-depleted regions D and the second AD refractive index of the second alkali-depleted regions D. In embodiments, the alternating electrical potential difference 340 (with or without DC offset) has a voltage that can be increased as a function of time. In this configuration, the TP-FAIX surface treatment can cause the respective thicknesses of the modified surface regions D, X to be greater than the thicknesses that would otherwise be formed without such increase in voltage as a function of time.

In some embodiments using the alternating electrical potential difference 340, the increase in voltage over time can be applied in a manner that is stepped up in one or more discrete intervals over a time period. The time period in some embodiments can be a fixed time period. In other embodiments, the time period can vary such that the time period increases and/or decreases over the total TP-FAIX surface treatment time. In some embodiments, the increase in voltage over time can be applied in a manner that is ramped up linearly as a function of time. In some embodiments, the increase in voltage over time can be applied in a manner that is ramped up in a non-linear fashion as a function of time such that there is a greater increase in voltage at earlier times and a reduced increase in voltage at later times.

One advantage of applying the electrical potential difference (fixed 240 or alternating 340) with an increase in voltage over time includes an ability to maximize the respective thicknesses of the modified surface regions D, X while also reducing total process time. The various voltage application approaches also have an advantage in avoiding thermal dielectric breakdown with the passage of too much current through the glass substrate, especially with low-resistivity glasses, allowing for higher final treatment voltages and thicker modified surface regions D, X. Alternatively, as breakdown strength varies with glass composition, surface condition, and ambient temperature, an "instant-on" strategy for applying the alternating electrical potential difference can also be tolerated under some conditions for convenience. It should be noted that TP-FAIX surface treatment times and potentials can vary depending on the glass composition.

After TP-FAIX surface treatment, the glass substrate 110 can be cooled to a temperature in the range from about 25° C. to about 80° C. for subsequent handling. The electrical potential difference 240, 340 can be removed prior to cooling or after cooling.

In embodiments, apparatus suitable for performing poling treatments can include any system that can simultaneously maintain heat and voltage to the glass/electrode stack in a controlled manner while avoiding practical problems such as leakage current paths or arcing. The apparatus can also provide control of the process atmosphere (e.g., under vacuum, in an inert gas environment such as dry $N_2$, or permeable gas environment) can minimize atmosphere effects and/or occluded gas at the interface. Exemplary systems configured to perform poling treatments and adaptable to perform TP-FAIX surface treatment are disclosed in U.S. Patent Application No. 63/193,334 entitled "GLASS WITH MODIFIED SURFACE REGIONS ON OPPOSING SIDES AND METHODS AND APPARATUSES FOR FORMING THE SAME VIA ELECTROTHERMAL POLING", the disclosure of which is incorporated herein by reference in its entirety.

Figure 3:
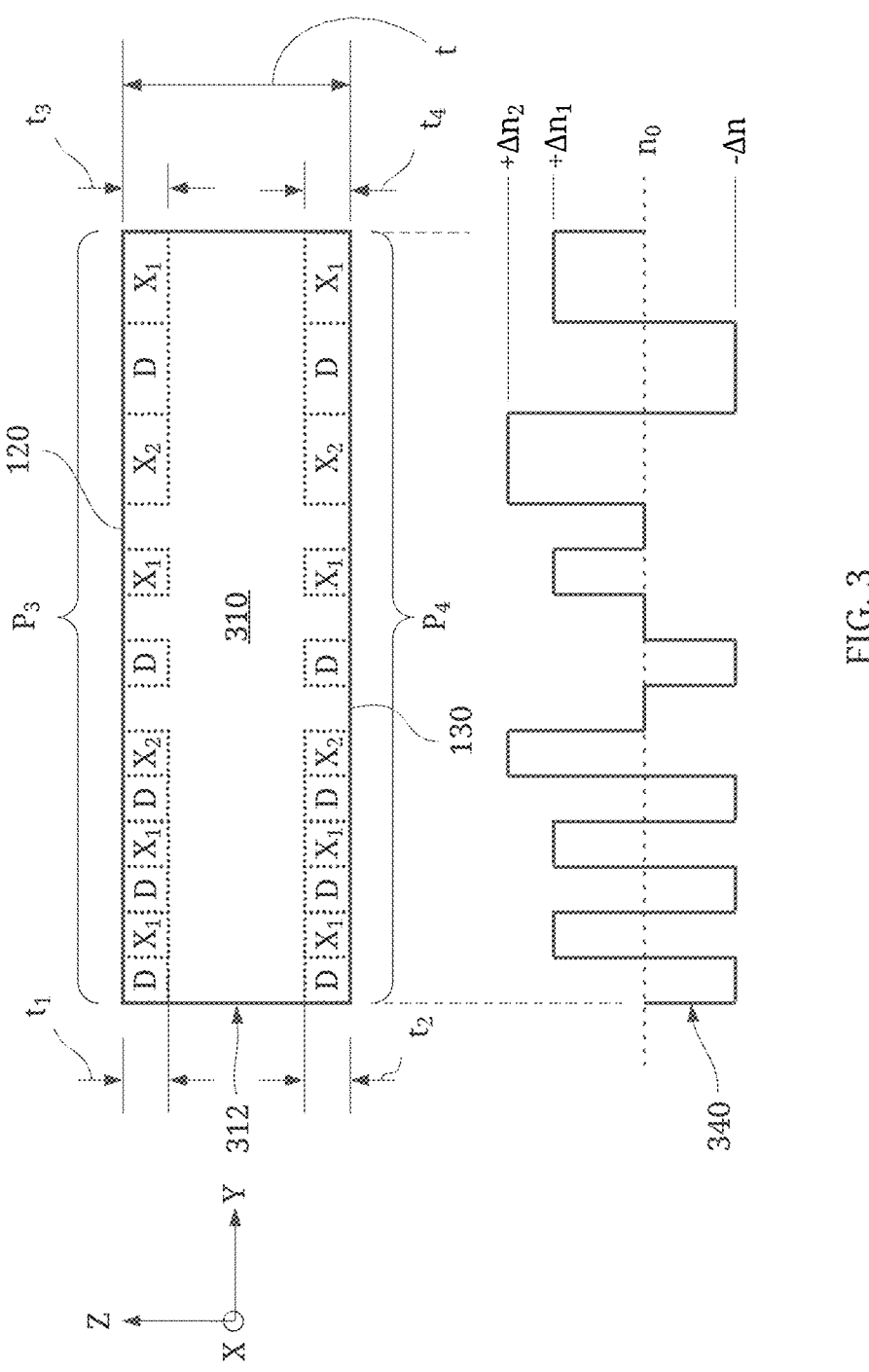
FIG. 3 is a side view of another glass substrate with modified surface regions arranged in at least one surface according to embodiments, the modified surface regions defining a refractive index profile.

FIG. 3 is a side view of another glass substrate 310 according to embodiments of the present disclosure. The glass substrate 310 includes an alkali-containing bulk 312, one or more alkali-depleted region(s) D that extend into the alkali-containing bulk 312 from one or both of the surfaces 120, 130, and one or more ion-exchanged region(s) $X_1$, $X_2$ that extend into the alkali-containing bulk 312 from one or both of the surfaces 120, 130. The surfaces include the first surface 120 and the second surface 130, which are on opposite sides of the glass substrate 310 in the embodiments shown. The glass substrate 310 of FIG. 3 possesses essentially the same compositional, structural, and electrical attributes with respect to the alkali-containing bulk, the alkali-depleted regions, and the ion-exchanged regions possessed by the glass substrate 110 of FIG. 1 except as described below.

In embodiments, the first ion-exchanged regions X at the first surface 120 of the glass substrate 310 can include a first group of one or more first ion-exchanged regions $X_1$ and a second group of one or more first ion-exchanged regions $X_2$. The first group $X_1$ includes first exchanged mobile metal ions that are exchanged into the glass network of the regions and occupy sites previously occupied by the exchangeable mobile metal ions of the alkali-containing bulk 312. The second group $X_2$ includes second exchanged mobile metal ions that are exchanged into the glass network of the regions and occupy sites previously occupied by the exchangeable mobile metal ions of the alkali-containing bulk 312. In embodiments, as shown in FIG. 3, the second exchanged mobile metal ions are different than the first exchanged mobile metal ions as indicated by use of the subscripts 1 and 2 following reference character X. In embodiments, the exchangeable mobile metal ions are $Na_2O$, the first exchanged mobile metal ions in the first group $X_1$ are one of $Ag_2O$ or $K_2O$, and the second exchanged mobile metal ions in the second group $X_2$ are the other of $Ag_2O$ or $K_2O$. In embodiments, the second ion-exchanged regions at the second surface 130 of the glass substrate 310 can include a first group of one or more second ion-exchanged regions $X_1$ and a second group of one or more second ion-exchanged regions $X_2$. In these embodiments, the first and second groups of the second ion-exchanged regions $X_1$, $X_2$ can include the first and second exchanged mobile metal ions, respectively.

The alkali-depleted regions D and the ion-exchanged regions $X_1$, $X_2$ at the first surface 120 and/or the second surface 130 each have a cross-sectional shape when viewed in the section plane oriented normal to the thickness direction (i.e., the XY plane in FIG. 3) and passing through the regions. In some embodiments, at least one of the alkali-depleted regions D and/or the ion-exchanged regions $X_1$, $X_2$ can have a lateral dimension or a width (i.e., along the Y axis) that is larger than the lateral dimension of other of the alkali-depleted regions D and/or the ion-exchanged regions $X_1$, $X_2$. For example, the three regions on the right side of the glass substrate 310 on each surface in the view of FIG. 3 are wider than the remaining regions in the middle and on the left side of the glass substrate 310.

The alkali-depleted regions D and the ion-exchanged regions $X_1$, $X_2$ at the first surface 120 and/or the second surface 130 can have any lateral spacing therebetween. In embodiments, such as shown in FIG. 3, some of the alkali-depleted regions D and some of the ion-exchanged regions $X_1$, $X_2$ have zero lateral spacing therebetween such that they abut one another. For example, the six regions on the left side of the glass substrate 310 on each surface in the view of FIG. 3 are in abutment, and the three regions on the right side of the glass substrate 310 on each surface in the view of FIG. 3 are in abutment. In contrast, the two regions in the middle of the glass substrate 310 on each surface in the view of FIG. 3 are spaced apart from one another and spaced part from the six regions on the left side and the three regions on the right side. These regions are spaced part with a nonzero lateral spacing similar to nonzero lateral spacing described above with respect FIG. 1.

The first alkali-depleted regions D and the first ion-exchanged regions $X_1$, $X_2$ of the glass substrate 310 define a third pattern $P_3$ on the first surface 120. The third pattern $P_3$ can take any form similar to the first pattern $P_1$ discussed with reference to the glass substrate 110 of FIG. 1. The third pattern $P_3$ across the first surface 120 in the embodiment of FIG. 3 (listing only the reference characters for the bulk portions, the alkali-depleted regions, and the ion-exchanged regions for simplicity) includes: D, $X_1$, D, $X_1$, D, $X_2$, 312, D, $X_1$, 312, $X_2$, D, $X_1$. It will be appreciated that the third pattern $P_3$ can have any sequence of the alkali-containing bulk (portions) 312, the first alkali-depleted regions D, and/or the first ion-exchanged regions $X_1$, $X_2$.

In embodiments, the second alkali-depleted regions D and the second ion-exchanged regions $X_1$, $X_2$ of the glass substrate 310 define a fourth pattern $P_4$ on the second surface 130. The fourth pattern $P_4$, like the third pattern $P_3$, can take any form. The fourth pattern $P_4$ in the embodiment of FIG. 3 is the same as the third pattern $P_3$. It will be appreciated that the fourth pattern $P_4$ can have any sequence of the alkali-containing bulk (portions) 312, the second alkali-depleted regions D, and/or the second ion-exchanged regions $X_1$, $X_2$.

In embodiments, the first group of first ion-exchanged regions $X_1$ at the first surface 120 of the glass substrate 310 comprises a first group ion-exchanged (IX) refractive index that is greater than the bulk refractive index of the alkali-containing bulk 312. Additionally, or alternatively, the second group of first ion-exchanged regions $X_2$ at the first surface 120 of the glass substrate 310 comprises a second group ion-exchanged (IX) refractive index that is greater than the bulk refractive index and the first group IX refractive index. In some embodiments, the second group IX refractive index is greater than the first group IX refractive index since the second exchanged mobile metal ions in the second group $X_2$ are different than the first exchangeable mobile metal ions in the first group $X_1$. In embodiments, the first and second groups of second ion-exchanged regions $X_1$, $X_2$ at the second surface 130 of the glass substrate 310 can comprise the first and second group IX refractive indices, respectively.

In embodiments, one or more of the first alkali-depleted regions D, the first ion-exchanged regions $X_1$, $X_2$, the second alkali-depleted regions D, and the second ion-exchanged regions $X_1$, $X_2$ define a refractive index profile 340 across the glass substrate 310 as shown in FIG. 3. The reference refractive index $n_0$ corresponds to the bulk refractive index of the alkali-containing bulk 312. A first positive change in refractive index $+\Delta n_1$ corresponds to the increase in refractive index within the first groups of the first and second ion-exchanged regions $X_1$. A second positive change in refractive index $+\Delta n_2$, greater than the first positive change $+\Delta n_1$, corresponds to the increase in refractive index within the second groups of the first and second ion-exchanged regions $X_2$. The negative change in refractive index $-\Delta n$ corresponds to the decrease in refractive index within the first and second alkali-depleted regions D.

As shown in FIG. 3, the relative changes in refractive index of the glass substrate 310 indicated by the refractive index profile 340 correspond with the third pattern $P_3$ of the first alkali-depleted regions D and the first ion-exchanged regions $X_1$, $X_2$ and/or with the fourth pattern $P_4$ of the second alkali-depleted regions D and the second ion-exchanged regions $X_1$, $X_2$. For instance, from left to right in FIG. 3, the refractive index profile 340 indicates the following sequence of refractive index changes across the glass substrate 310 with the corresponding portions/regions of the glass substrate 310 indicated parenthetically: $-\Delta n$ (D), $+\Delta n_1$ ($X_1$), $-\Delta n$ (D), $+\Delta n_1$ ($X_1$), $-\Delta n$ (D), $+\Delta n_2$ ($X_2$), $n_0$ (312), $-\Delta n$ (D), $n_0$ (312), $+\Delta n_1$ ($X_1$), $n_0$ (312), $+\Delta n_2$ ($X_2$), $-\Delta n$ (D), $+\Delta n_1$ ($X_1$). It will be appreciated that the refractive index profile 340 can include a multitude of different sequences of refractive index changes across the glass substrate since the refractive index profile 340 corresponds with the third pattern $P_3$ and/or the fourth pattern $P_4$.

Figure 4:
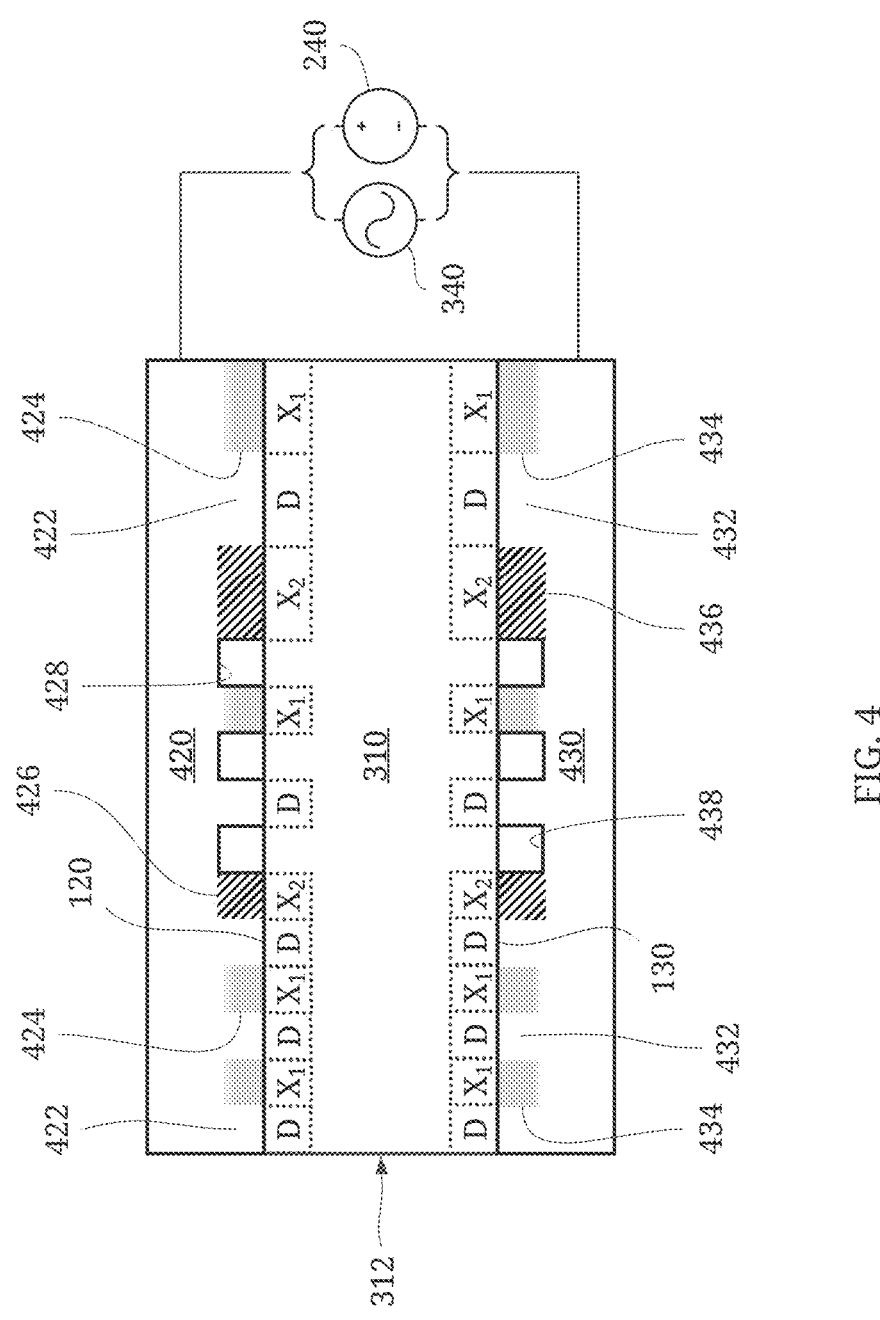
FIG. 4 is a side view of the glass substrate of FIG. 3 during a surface treatment process in which the modified surface regions are formed in the at least one surface according to embodiments.

FIG. 4 is a side view of modified surface regions formed in at least one surface of the glass substrate 310 of FIG. 3 during TP-FAIX surface treatment using thermal poling and field-assisted ion exchange according to the method of the present disclosure. The TP-FAIX surface treatment of the glass substrate 310 is performed in a similar manner as the TP-FAIX surface treatment of the glass substrate 110 of FIG. 1. As shown in FIG. 4, TP-FAIX surface treatment of the glass substrate 310 includes contacting the first electrode 420 to the first surface 120 of the glass substrate 310, contacting the second electrode 430 to the second surface 130 of the glass substrate 310, and applying an electrical potential difference 240, 340 to the glass substrate 310. The first and second electrodes 420, 430 shown in FIG. 4 are configured and operated in a similar manner as the first and second electrodes 220, 230 shown in FIG. 2 except as described below.

In embodiments, the first electrode 420 includes a first portion 422 and a second portion (424, shown with shading in the figures for clarity) that contact the first region (corresponding to the one or more first alkali-depleted regions D) and the second region (corresponding to the one or more first ion-exchanged regions X), respectively, along the first surface 120 shown in FIGS. 3 and 4. The second electrode 430 includes a third portion 432 and a fourth portion (434, shown with shading in the figures for clarity) that contact the third region (corresponding to the one or more second alkali-depleted regions D) and the fourth region (corresponding to the one or more second ion-exchanged regions X), respectively, along the second surface 130 shown in FIGS. 3 and 4.

Different from the first electrode 220 of FIG. 2, the first electrode 420 of FIG. 4 further includes a fifth portion 426

(shown with cross-hatching in the figure for clarity) that contacts a fifth region of the first surface 120 of the glass substrate 310 during TP-FAIX surface treatment. Different from the second electrode 230 of FIG. 2, the second electrode 430 of FIG. 4 further includes a sixth portion 436 (shown with cross-hatching in the figure for clarity) that contacts a sixth region of the second surface 130 of the glass substrate 310 during TP-FAIX surface treatment. The fifth and sixth portions 426, 436 of the electrodes 420, 430 are configured to treat the surfaces 120, 130 of the glass substrate 310 using field-assisted ion exchange mechanisms during TP-FAIX surface treatment.

The second region (next to the second portions 424) and the fifth region (next to the fifth portions 426) after TP-FAIX treatment correspond to the first group of one or more first ion-exchanged regions $X_1$ and the second group of one or more first ion-exchanged regions $X_2$, respectively, along the first surface 120 shown in FIGS. 3 and 4. The fourth region (next to the fourth portions 434) and the sixth region (next to the sixth portions 436) after TP-FAIX treatment correspond to the first group of one or more second ion-exchanged regions $X_1$ and the second group of one or more second ion-exchanged regions $X_2$, respectively, along the second surface 130 shown in FIGS. 3 and 4.

The second portions 424 of the first electrode 420 can comprise the second portion electrode material, and the fifth portions 426 of the first electrode 420 can comprise a fifth portion electrode material. The second and fifth portion electrode materials are configured to induce ion exchange in the second regions $X_1$ and the fifth regions $X_2$ of the alkali-containing bulk 312 when the first electrode 420 contacts first surface 120 of the glass substrate 310 under a positive electrical bias. The second portion electrode material is different than the fifth portion electrode material in embodiments to enable formation of the first group of one or more first ion-exchanged regions $X_1$ and a second group of one or more first ion-exchanged regions $X_2$ in the first surface 120. The second portion electrode material in some embodiments is selected from silver (Ag), potassium (K), or combinations thereof. In these embodiments, the fifth portion electrode material is a different one selected from silver (Ag), potassium (K), or combinations thereof.

The fourth portions 434 of the second electrode 430 can comprise the fourth portion electrode material, and the sixth portions 436 of the second electrode 430 can comprise a sixth portion electrode material. The fourth and sixth portion electrode materials are configured to induce ion exchange in the fourth regions $X_1$ and the sixth regions $X_2$ of the alkali-containing bulk 312 when the second electrode 430 contacts second surface 130 of the glass substrate 310 under a positive electrical bias. The fourth portion electrode material is different than the sixth portion electrode material in embodiments to enable formation of the first group of one or more second ion-exchanged regions $X_1$ and a second group of one or more second ion-exchanged regions $X_2$ in the second surface 120. The fourth portion electrode material in some embodiments is selected from silver (Ag), potassium (K), or combinations thereof. In these embodiments, the sixth portion electrode material is a different one selected from silver (Ag), potassium (K), or combinations thereof.

The first portion 422, the second portion 424, and the fifth portion 426 of the first electrode 420 of FIG. 4 each correspond in number, approximate position, and approximate cross-sectional size and shape to the first alkali-depleted regions D, the first group of first ion-exchanged regions $X_1$, and the second group of first ion-exchanged regions $X_2$, respectively, when the first electrode 420 is positioned in contact with the first surface 120 of the glass substrate 310. In this arrangement, the first portion(s) 422, the second portion(s) 424, and the fifth portion(s) 426 define a first template on the first electrode 420 that corresponds with the third pattern $P_3$ (FIG. 3) on the first surface 120. Similarly, the third portion 432, the fourth portion 434, and the sixth portion 436 of the second electrode 430 of FIG. 4 each correspond in number, approximate position, and approximate cross-sectional size and shape to the second alkali-depleted regions D, the first group of second ion-exchanged regions $X_1$, and the second group of second ion-exchanged regions $X_2$, respectively, when positioned in contact with the second surface 130. In this arrangement, the third portion(s) 432, the fourth portion(s) 434, and the sixth portions 436 define a second template on the second electrode 430 that corresponds with the fourth pattern $P_4$ (FIG. 3) on the second surface 130.

Figure 5:
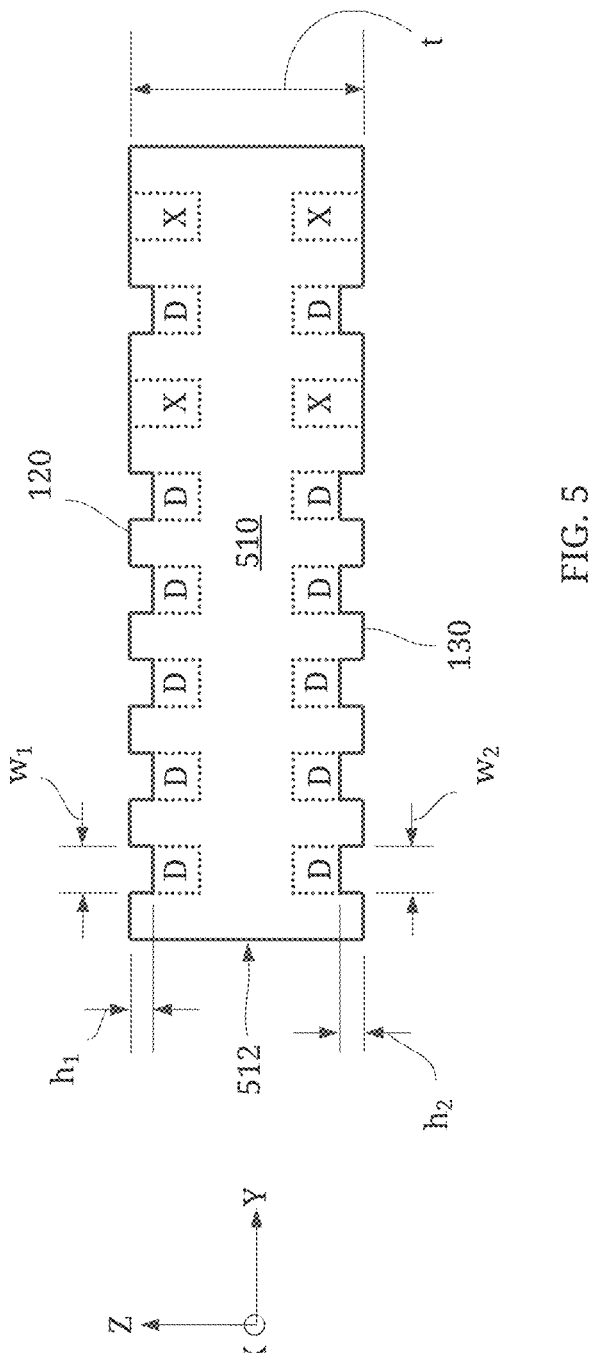
FIG. 5 is a side view of a yet another glass substrate according to embodiments, the glass substrate exhibiting a surface topology corresponding to modified surface regions formed in at least one surface of the glass substrate.

FIG. 5 is a side view of a yet another glass substrate 510. Similar to the glass substrate 110 of FIG. 1, the glass substrate 510 of FIG. 5 includes an alkali-containing bulk 512 and one or more alkali-depleted regions D. The glass substrate can also include one or more ion-exchanged regions X as shown. The alkali-depleted regions D alone or in combination with the ion-exchanged regions X define a pattern on the first surface 120 and/or on the second surface 130. It will be appreciated that the pattern can have any sequence of the alkali-containing bulk (portions) 512, the first alkali-depleted regions D, and/or the first ion-exchanged regions X.

As shown in FIG. 5, the first surface 120 and the second surface 130 are recessed along surface portions that are adjacent to the alkali-depleted regions D. These recesses or depressions in the surface form as a result of volumetric loss that occurs in the regions of the glass substrate 510 subjected to thermal poling mechanisms during TP-FAIX surface treatment. At the first surface 120, the first alkali-depleted regions D each define at least a portion of a first topographical feature. The first topographical feature in some embodiments includes a height $h_1$ from the alkali-containing bulk 512 to a lowermost surface of the recess or depression in a direction parallel to a thickness t of the glass substrate 512 between the first and second surfaces 120, 130. The first topographical feature in some embodiments also includes a width $w_1$ between lateral walls of the recess or depression, for example, in a direction parallel to the Y axis in FIG. 5. The lateral walls can be defined by the alkali-containing bulk 512 and/or the ion-exchanged regions X in some embodiments. Similar to the first alkali-depleted regions D, the second alkali-depleted regions D each define at least a portion of a second topographical feature with a height $h_2$ and a width $w_2$ along the second surface 130. The first and second topographical features in the embodiment shown in FIG. 5 are negative features since they form depressions in the first surface 120 of the alkali-containing bulk 512 and are at least partially defined by the alkali-containing bulk 512.

In embodiments, the first and second topographical features can have nanoscale (<1 μm) width and height dimensions after TP-FAIX surface treatment according to the methods disclosed herein. In embodiments, the first and second topographical features can have microscale (1-1000 μm) width and height dimensions after TP-FAIX surface treatment according to the methods disclosed herein. In embodiments, the first and second topographical features can have nanoscale (<1 μm) width dimensions and microscale (1-1000 μm) height dimensions after TP-FAIX surface treatment according to the methods disclosed herein.

Figure 6:
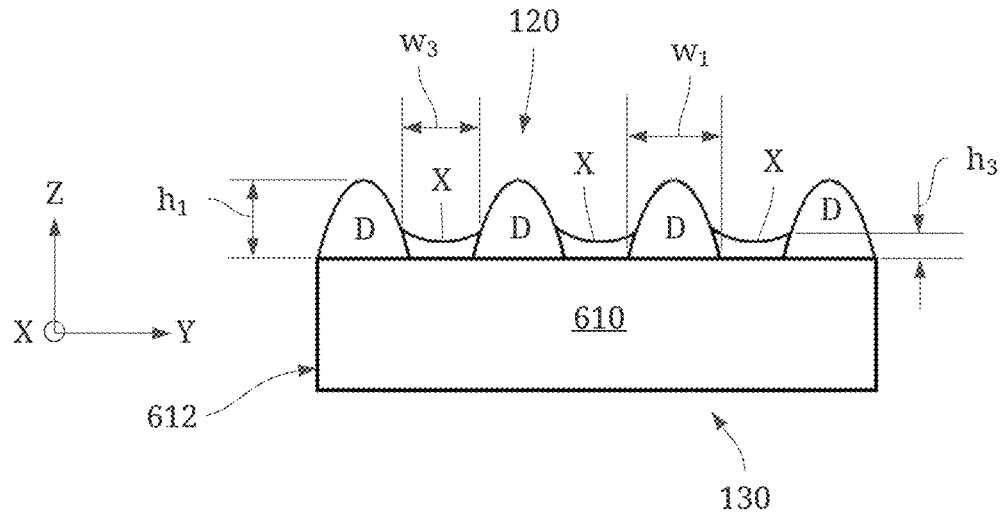
FIG. 6 is an optical structure according to embodiments.

FIG. 6 is a side view of still another glass substrate 610. Similar to the glass substrate 510 of FIG. 5, the glass substrate 610 of FIG. 6 includes an alkali-containing bulk 612, one or more alkali-depleted regions D, and one or more ion-exchanged regions X. The alkali-depleted regions D and the ion-exchanged regions X define a pattern on the first side/surface 120. It will be appreciated that the pattern can have any sequence of the alkali-containing bulk (portions) 612, the first alkali-depleted regions D, and/or the first ion-exchanged regions X. The pattern formed on the first side/surface 120 during TP-FAIX surface treatment of the glass substrate 610, and prior to further surface processing as described herein, includes an alternating sequence of alkali-depleted regions D and the ion-exchanged regions X that are positioned proximate and/or adjacent to one another and extend entirely across the surface.

In the embodiment shown in FIG. 6, the glass substrate 610 has been subjected to an etch process after TP-FAIX surface treatment. When an etchant is applied to a glass substrate that has been thermal poled and/or subject to TP-FAIX surface treatment, which includes thermal poling mechanisms, the etchant can have different etch rates through the modified and unmodified surface regions of the glass substrate. Specifically, in regions of the glass substrate modified via thermal poling mechanisms, such as the alkali-depleted regions D of the glass substrate 610, the etchant will have a slower etch rate than for unmodified regions, such as the alkali-containing bulk 612. The etchant may also have a slower etch rate in the alkali-depleted regions D than for regions of the glass substrate modified via FAIX mechanisms, such as the ion-exchanged regions X of the glass substrate 610. This differential etching between the alkali-depleted regions D and the unmodified regions and between the alkali-depleted regions D and the ion-exchanged regions X can be used to further enhance and/or tune surface topography as shown in FIG. 6.

As shown in FIG. 6, the alkali-depleted regions D each define at least a portion of a first topographical feature, and the ion-exchanged regions X each define at least a portion of a second topographical feature. The first topographical features each have a height $h_1$ and a width $w_1$, and the second topographical features each have a height $h_3$ and a width $w_3$. The first topographical features are positive features that protrude from the glass substrate 610 and are defined substantially by the alkali-depleted regions D. The second topographical features are negative features that are recessed into the glass substrate 610 and are defined significantly by the alkali-depleted regions D and the ion-exchanged regions X. The heights h1, h3 and widths w1, w3 of the first and second topographical features of the glass substrate 610 shown in FIG. 6 can have the same dimensions described with reference to the glass substrate 510 shown in FIG. 5. The glass substrate 610 shown in FIG. 6 represents an exemplary optical structure for a transparent diffuser according to the disclosure.

EXAMPLES

The following examples further clarify the various embodiments disclosed herein.

Example 1

Glass samples were prepared from a precursor (or parent) glass having a composition that includes 76.1 mol % $SiO_2$, 5.2 mol % $Al_2O_3$, 11.8 mol % $Na_2O$, 0.03 mol % CaO, 0.05 mol % $Fe_2O_3$, 6.7 mol % MgO, 0.01 mol % $SnO_2$. The glass samples were polished into a planar coupon having dimensions from about 2 inches by 2 inches square cross section with 1.1 mm thickness.

For surface treatment of some samples, a silver coating was placed in contact with a surface of the glass sample, and a graphite coating was placed in contact with an opposite surface of the glass sample. The coated sample was placed between graphite electrodes. A mechanical pressure gage was used to press the electrode/sample stack together and apply pressure in a range from about 5 PSI to about 10 PSI on the stack to promote intimate contact between the mating surfaces of the stack. The glass sample and electrodes were heated to a treatment temperature of about 300° C., allowing sufficient time for the stack to reach equilibrium. The glass sample was then subjected to surface treatment using a fixed DC electric field at a voltage of 200V over a thermal poling time of about 20 minutes. For surface treatment of some samples, the graphite coating was placed on both of the opposing surfaces of the glass sample instead of using the silver coating on one of the surfaces.

The presence, depth, and composition of the alkali-depleted regions in the glass samples after surface treatment using only the graphite coating were evaluated using secondary-ion-mass-spectrometry (SIMS). The results of one such analysis is summarized in FIG. 7 in which the SIMS elemental depth profiles are presented as concentration of each of lithium (Li), sodium (Na), magnesium (Mg), Aluminum, (Al), silicon (Si), potassium (K), and calcium (Ca) as a function of depth ($\mu$m) through an alkali-depleted region of a glass sample. As shown in FIG. 7, a sodium (Na) depletion region was formed in the glass sample to a depth of approximately 1.12 $\mu$m.

Figure 8B:
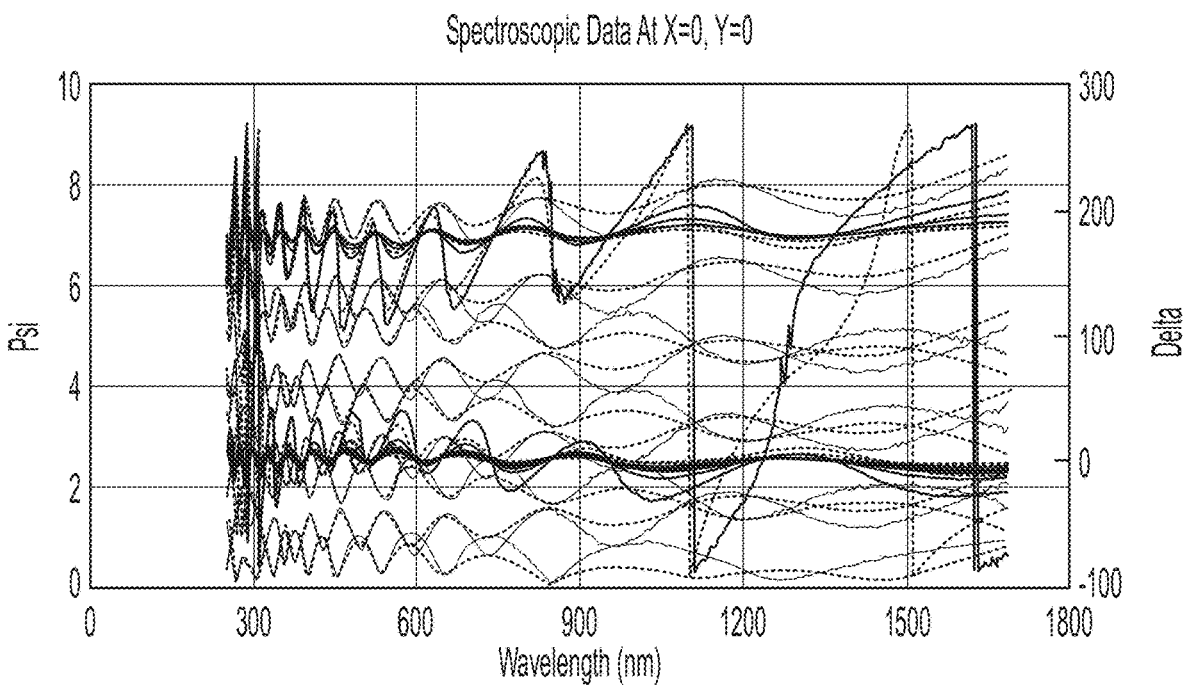
Figure 8C:
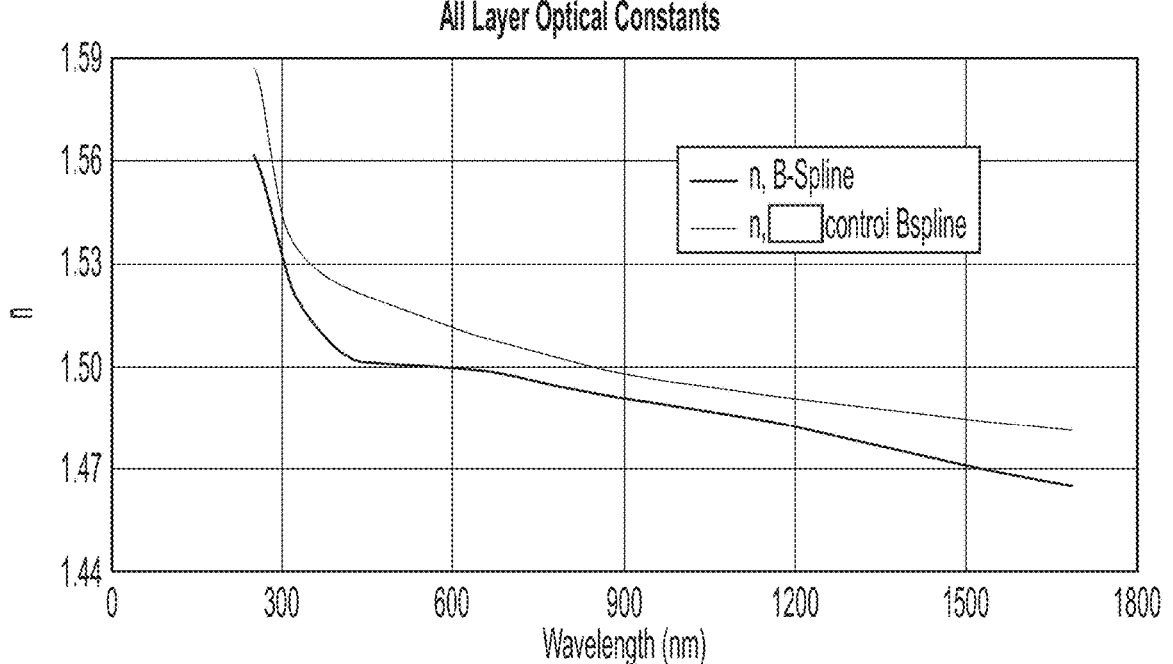

The refractive indices through the parent glass/alkali-containing bulk and the alkali-depleted regions after surface treatment of the glass samples were evaluated using spectroscopic ellipsometry. The results of one such analysis is summarized in FIGS. 8A-8C in which a lower-than-initial refractive index is observed in an alkali-depleted region of a glass sample. FIG. 8C illustrates a fitted refractive index for an alkali-depleted region being lower than that of the parent glass.

Figures 9, 10A:
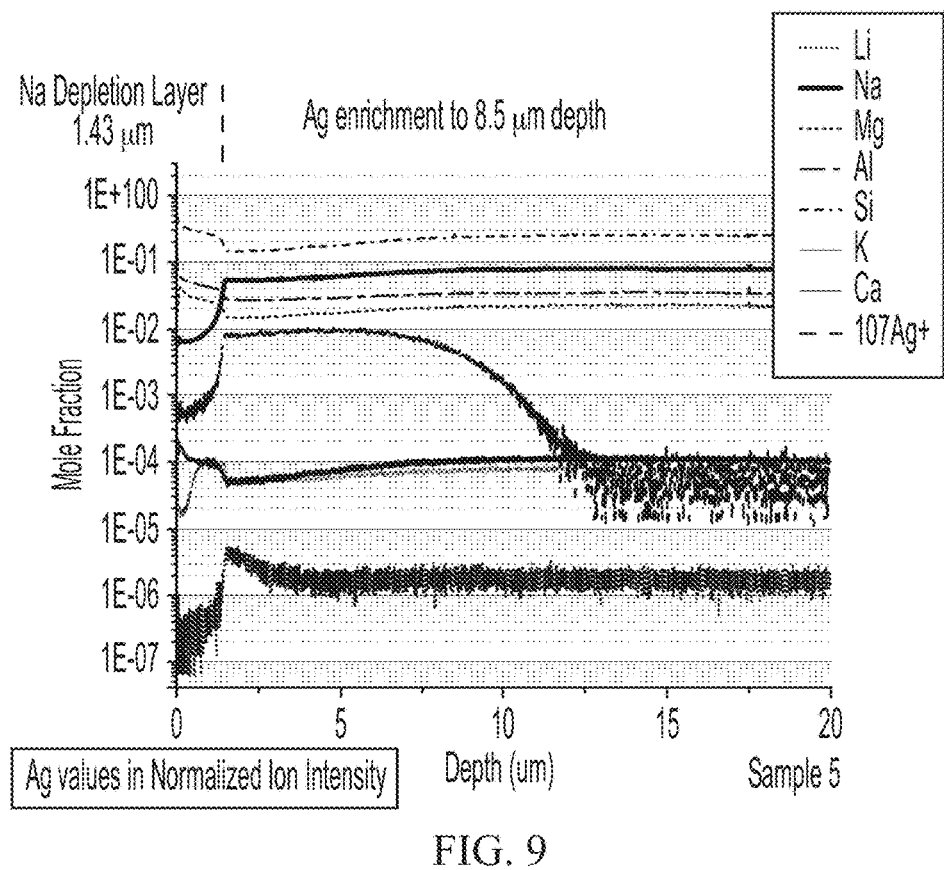
FIG. 9 shows SIMS depth profiles for certain elements through an ion-exchanged surface region of a second glass sample of Example 1 after a surface treatment process.
FIGS. 10A-10C present graphical data illustrating the higher refractive index of the ion-exchanged surface region of FIG. 9 compared to the refractive index of the bulk of the second glass sample of Example 1 as measured by spectroscopic ellipsometry.

The presence, depth, and composition of the ion-exchanged regions in the glass samples after surface treatment using the silver coating were evaluated using SIMS. The results of one such analysis is summarized in FIG. 9 in which the SIMS elemental depth profiles are presented as concentration of each of lithium (Li), sodium (Na), magnesium (Mg), Aluminum, (Al), silicon (Si), potassium (K), and calcium (Ca), and silver (Ag) as a function of depth ($\mu$m) through an ion-exchanged region of a glass sample. As shown in FIG. 9, a silver (Ag) enrichment region was formed in the glass sample to a depth of approximately 8.5 $\mu$m.

Figure 10B:
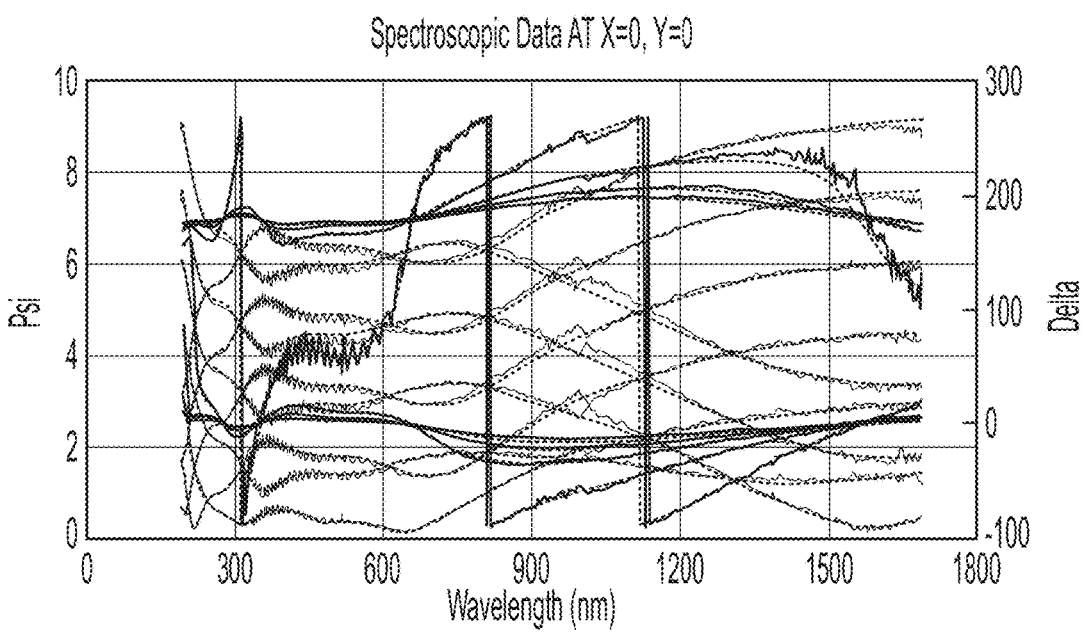
Figure 10C:
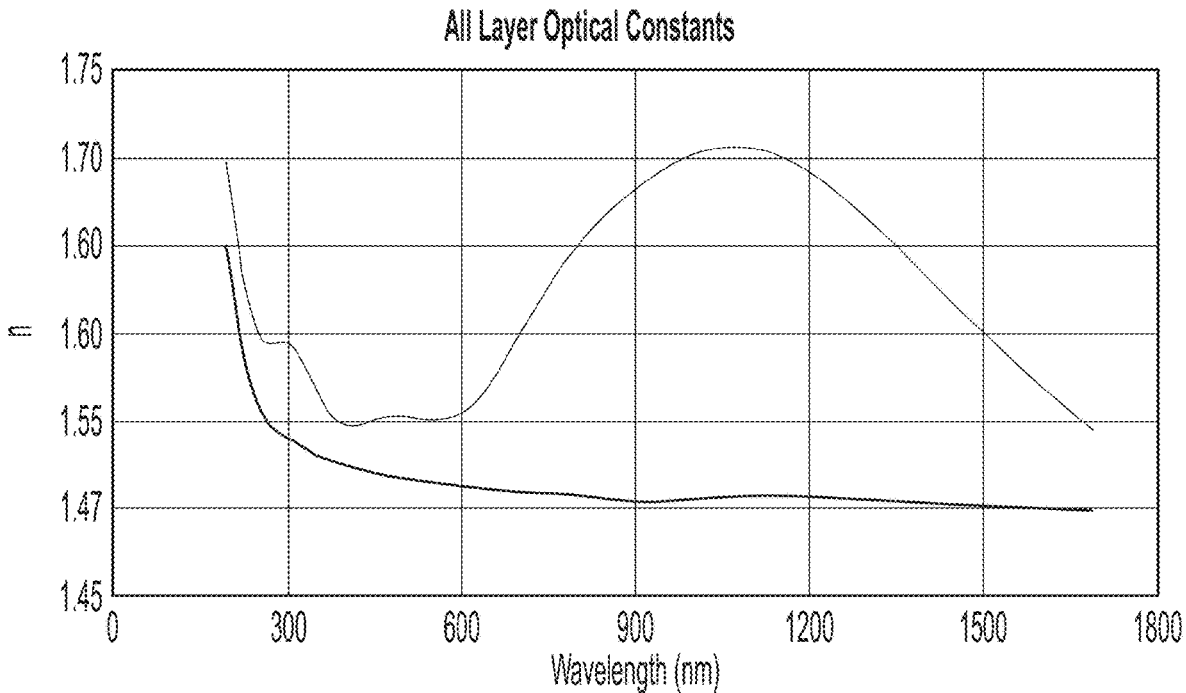

The refractive indices through the parent glass/alkali-containing bulk and the ion-exchanged regions after surface treatment of the glass samples were evaluated using spectroscopic ellipsometry. The results of one such analysis is summarized in FIGS. 10A-10C in which a higher-than-initial refractive index is observed in an ion-exchanged region of a glass sample. FIG. 10C illustrates a fitted refractive index for an ion-exchanged region being higher than that of the parent glass.

Example 2

Figure 11:
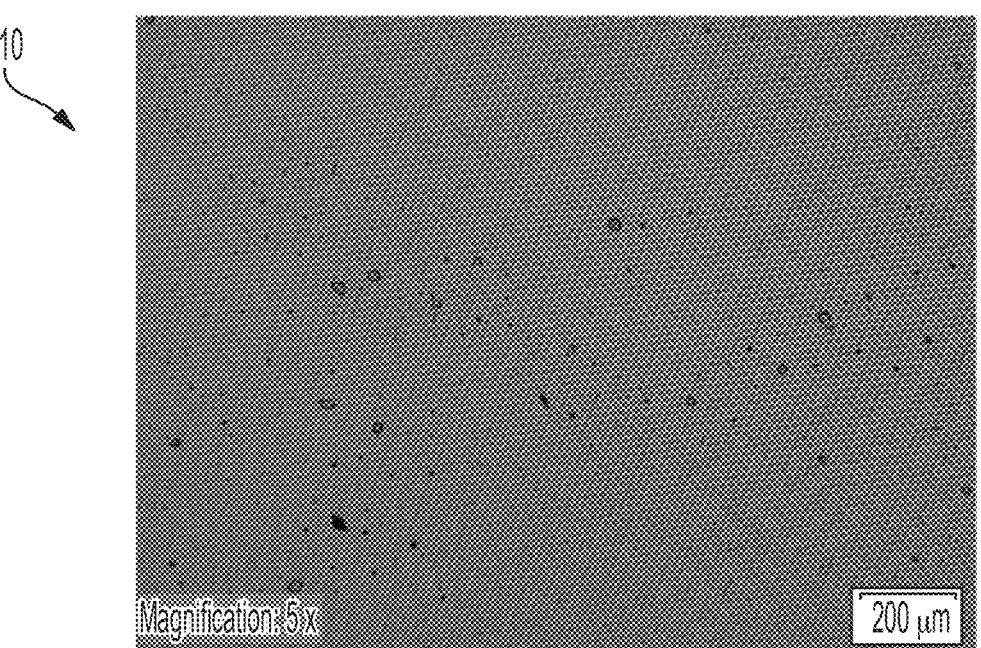
FIGS. 11 and 12 are enlarged images showing portions of a patterned electrode configured to simultaneously form alkali-depleted regions and ion-exchanged regions on the same surface of a glass sample.
Figure 12:
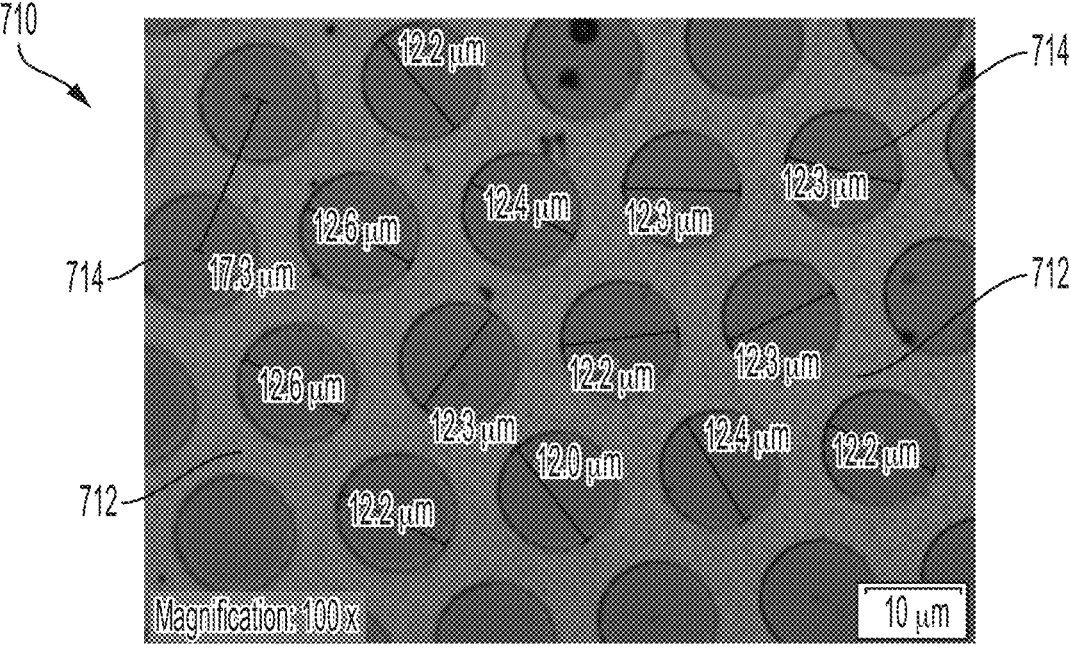

An electrode was prepared to simultaneously form alkali-depleted regions and ion-exchanged regions on the same surface of a glass sample via TP-FAIX surface treatment. FIGS. 11 and 12 are enlarged images showing portions of a major surface of the electrode 710. The electrode 710 has a rectilinear cross section and a thickness configured to prevent damage during handling and use thereof. The electrode 710 has a body or matrix 712 and a plurality of pads 712 arranged in a hex array pattern on the body 712. The exposed outward facing surfaces of the body 712 and the pads 714 define the major surface of the electrode 710. The body 712 includes platinum (Pt) and each of the pads 714 includes silver (Ag). The pads 714 each have a circular cross section with a diameter in a range from about 11.5 $\mu$m to about 13 $\mu$m. A distance between the geometric centers of the cross sections of the pads 714 is in a range from about 16.5 $\mu$m to about 18 $\mu$m. The pads 714 each protrude from the body 712 with a height in a range from about 50 nm to about 65 nm. The pads 714 have a P-V surface roughness of about 10 nm.

The major surface of the electrode 710 was brought into contact with a first surface of the glass sample of Example 2 while a second graphite electrode was brought into contact with an opposite second surface of the glass sample. The glass sample of Example 2 had the same composition as the glass samples described in Example 1, and TP-FAIX treatment was carried out according to similar test conditions as described in Example 1. Without being bound by theory, it is believed that both the body 712 and the pads 714 make intimate contact with the first surface of the glass sample when the electrode/sample stack is pressed together by the mechanical pressure gage and voltage is applied to the electrodes. This intimate contact results because the corresponding electric field gradient will induce an electrostatic pressure that tends to pull the surfaces into more intimate contact. The materials of the body 712 and the pads 714 also have a finite elastic modulus such that they can be compressed to some extent during pressing and surface treatment.

Figures 13, 14:
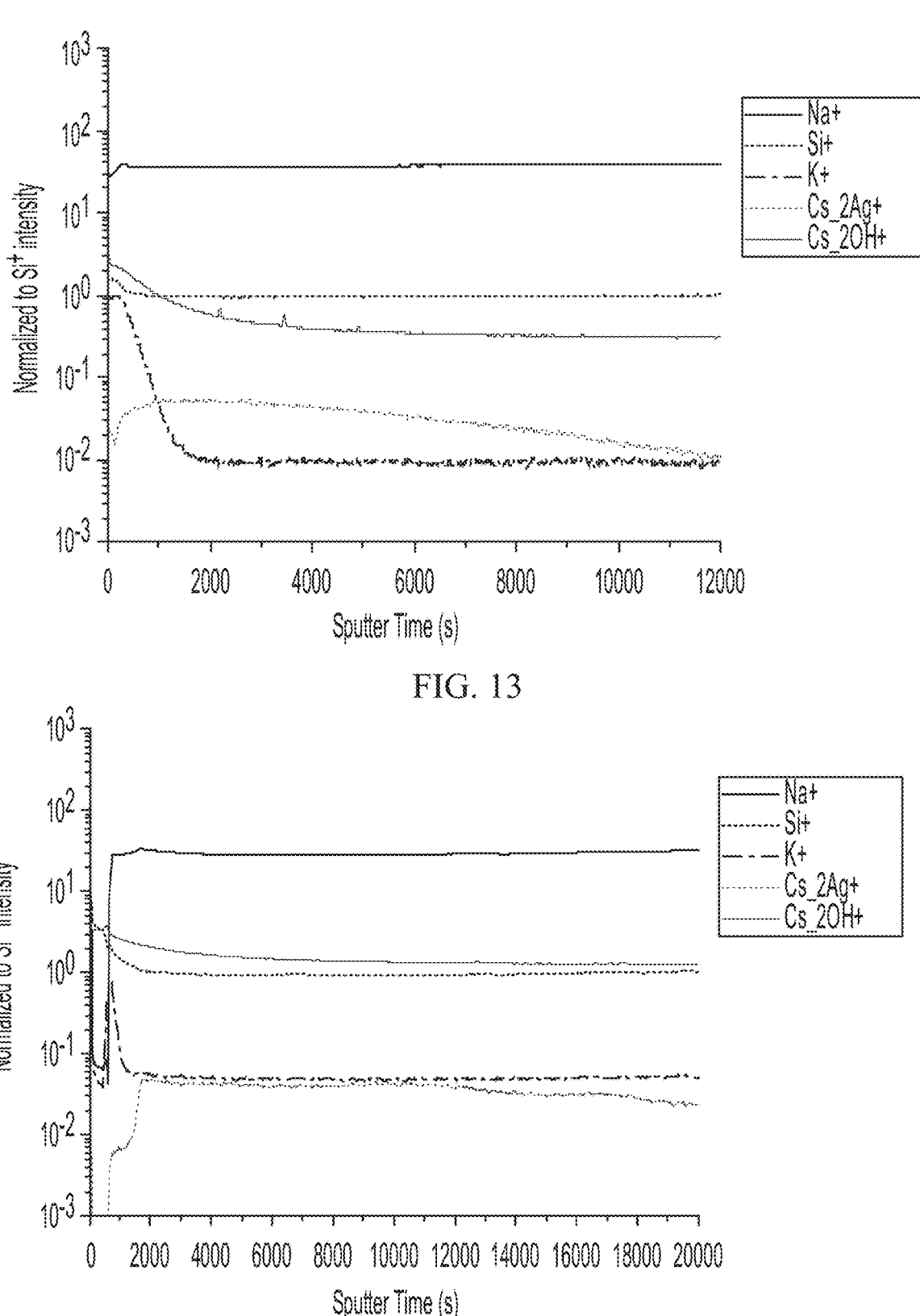
FIG. 13 shows SIMS depth profiles for certain elements through an ion-exchanged region of a glass sample of Example 2 after a surface treatment process using the patterned electrode of FIGS. 11 and 12.
FIG. 14 shows SIMS depth profiles for certain elements through an alkali-depleted region of the glass sample of Example 2 after the surface treatment process using the patterned electrode of FIGS. 11 and 12.

The presence, depth, and composition of the ion-exchanged regions in the glass sample of Example 2 after TP-FAIX treatment were evaluated using secondary-ion-mass-spectrometry (SIMS). The results of one such analysis is summarized in FIG. 13 in which the SIMS elemental depth profiles are presented as a concentration of each of sodium (Na), silicon (Si), potassium (K), cesium and silver (Cs_2Ag), and cesium and hydroxyl (Cs_2OH) as a function of sputter time (s) through an ion-exchanged region of the glass sample. As shown in FIG. 13, an ion-exchanged region that is enriched with silver was formed in the glass sample to a depth of at least 5 $\mu$m. The ion-exchanged region has a peak silver concentration at a sputter time of approximately 2000 s, which corresponds to a depth of approximately 1 $\mu$m. The ion-exchanged region has a silver concentration of about 50% of the peak silver concentration at a sputter time of approximately 8000 s, which corresponds to a depth of approximately 4 $\mu$m. The data acquisition was ended arbitrarily at approximately 16 hours.

The presence, depth, and composition of the alkali-depleted regions in the glass sample of Example 2 after TP-FAIX treatment were evaluated using SIMS. The results of one such analysis is summarized in FIG. 14 in which the SIMS elemental depth profiles are presented as concentration of each of sodium (Na), silicon (Si), potassium (K), cesium and silver (Cs_2Ag), and cesium and hydroxyl (Cs_2OH) as a function of sputter time (s) through an alkali-depleted region of the glass sample. As shown in FIG. 14, a sodium (Na) depletion region was formed in the glass sample to a depth of approximately 500 nm. A transition from the NA depletion region to the NA concentration in the bulk occurs at a sputter time of approximately 1000 s.

Example 3

Figures 15, 16:
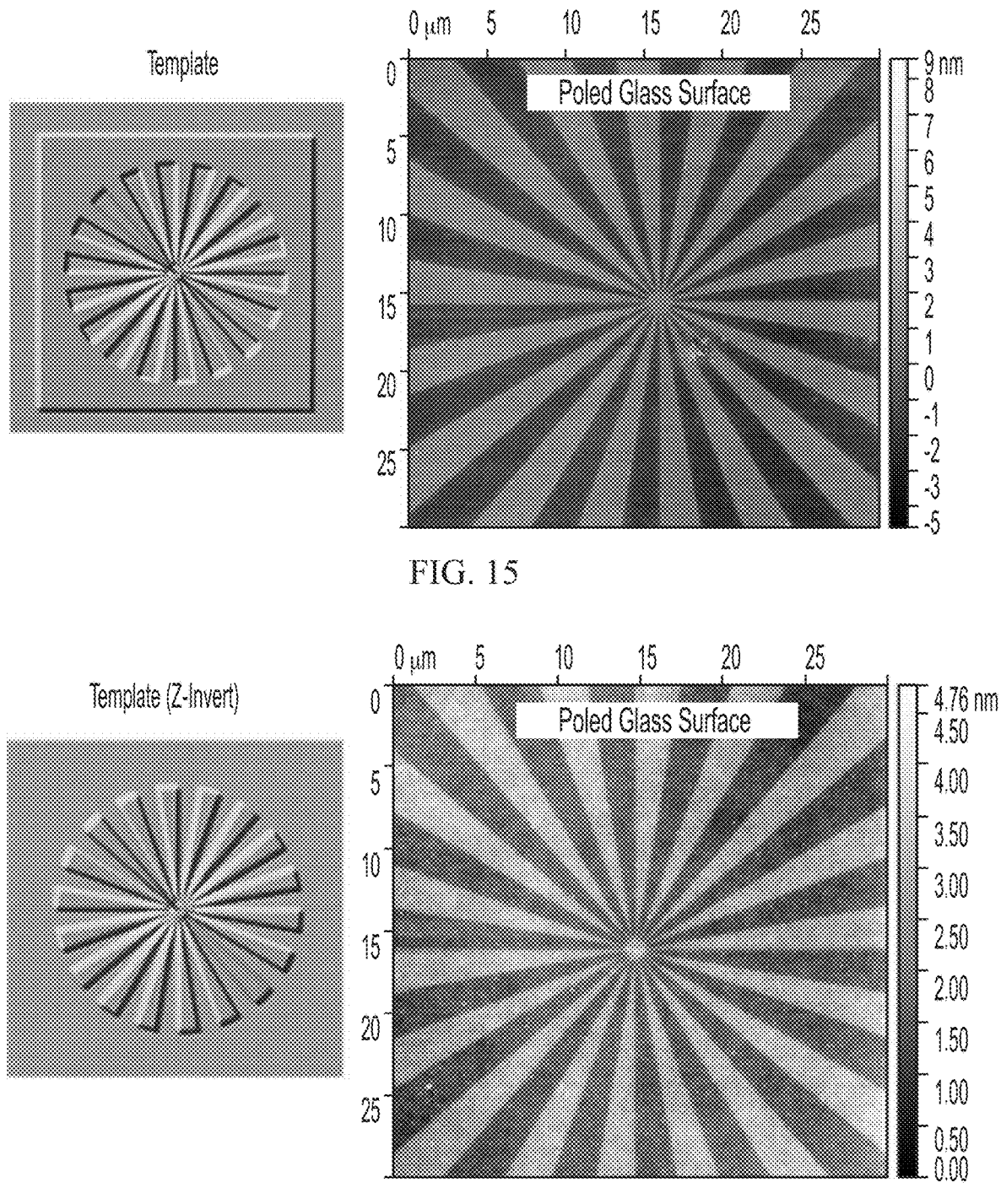
FIGS. 15-18 show side-by-side images of template electrodes and glass surfaces thermal poled by the template electrodes.
Figure 17:
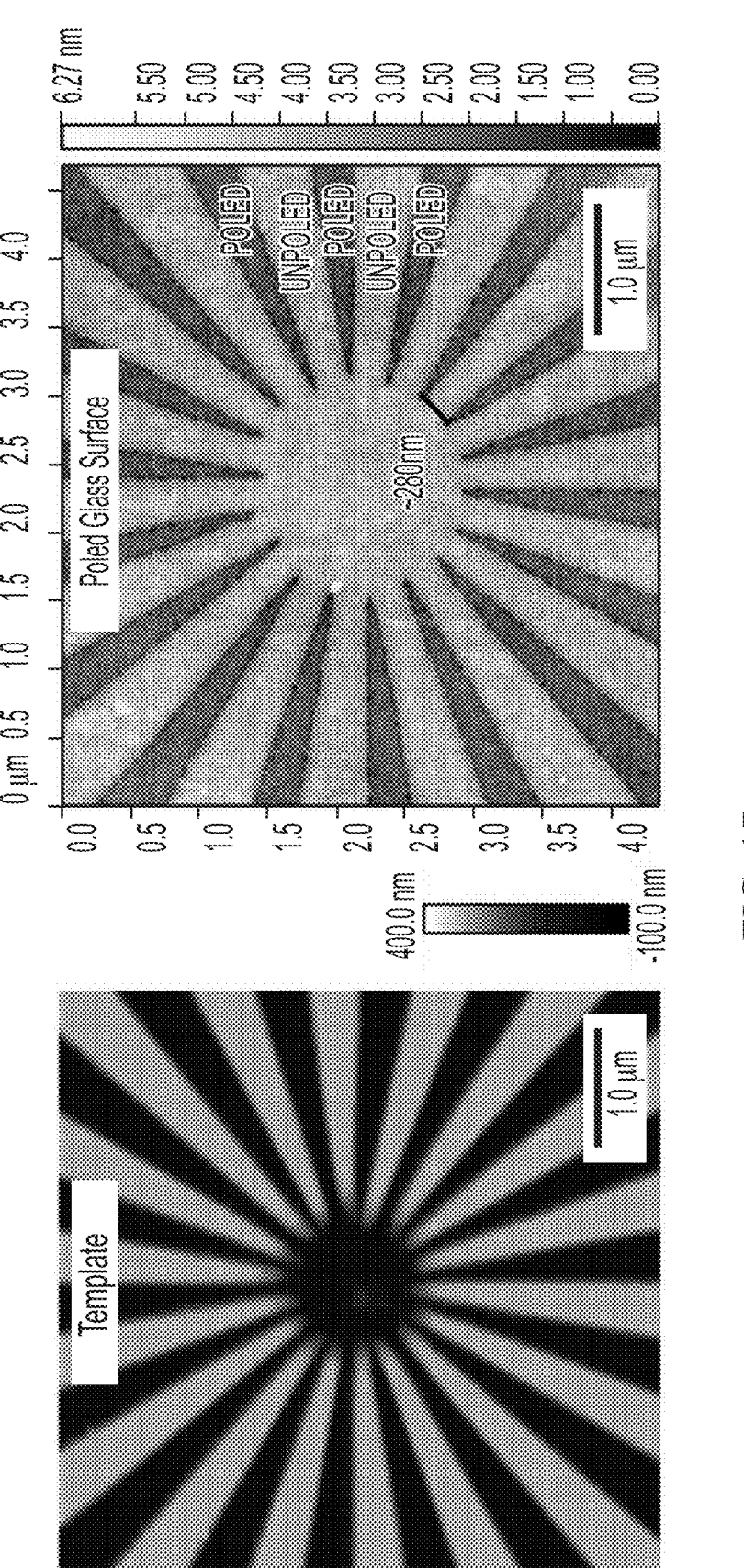

Topographical features were formed in glass substrates using thermal poling mechanisms. FIGS. 15-17 are images of glass samples with thermal poled surfaces, showing nanoscale topographical features imprinted from a patterned electrode. FIGS. 15 and 16 are images of the thermal poled surfaces showing imprints at a variety of length scales, as formed simultaneously with a pinwheel pattern. FIG. 17 is an enlargement of the central region of each of the patterned electrode (left) and the imprinted pinwheel pattern in the surface of the glass sample (right), illustrating fidelity down to approximately a few-hundred-nm length scale.

Figure 18:
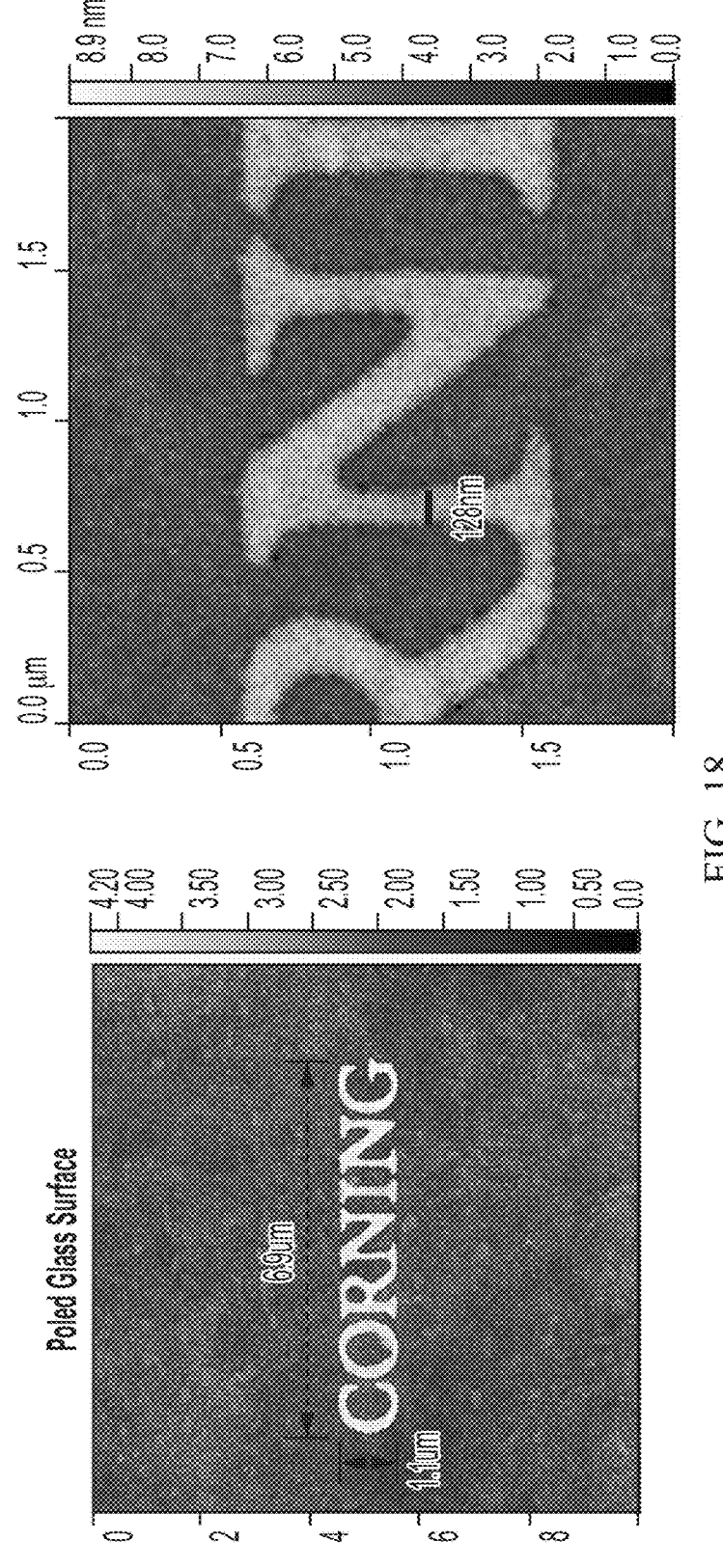

FIG. 18 includes images of poled glass surfaces, showing nanoscale topographical features imprinted from a patterned electrode and illustrating fidelity down to nanometer length scale.

Figures 19A, 19B, 19C, 19D, 19E, 19F:
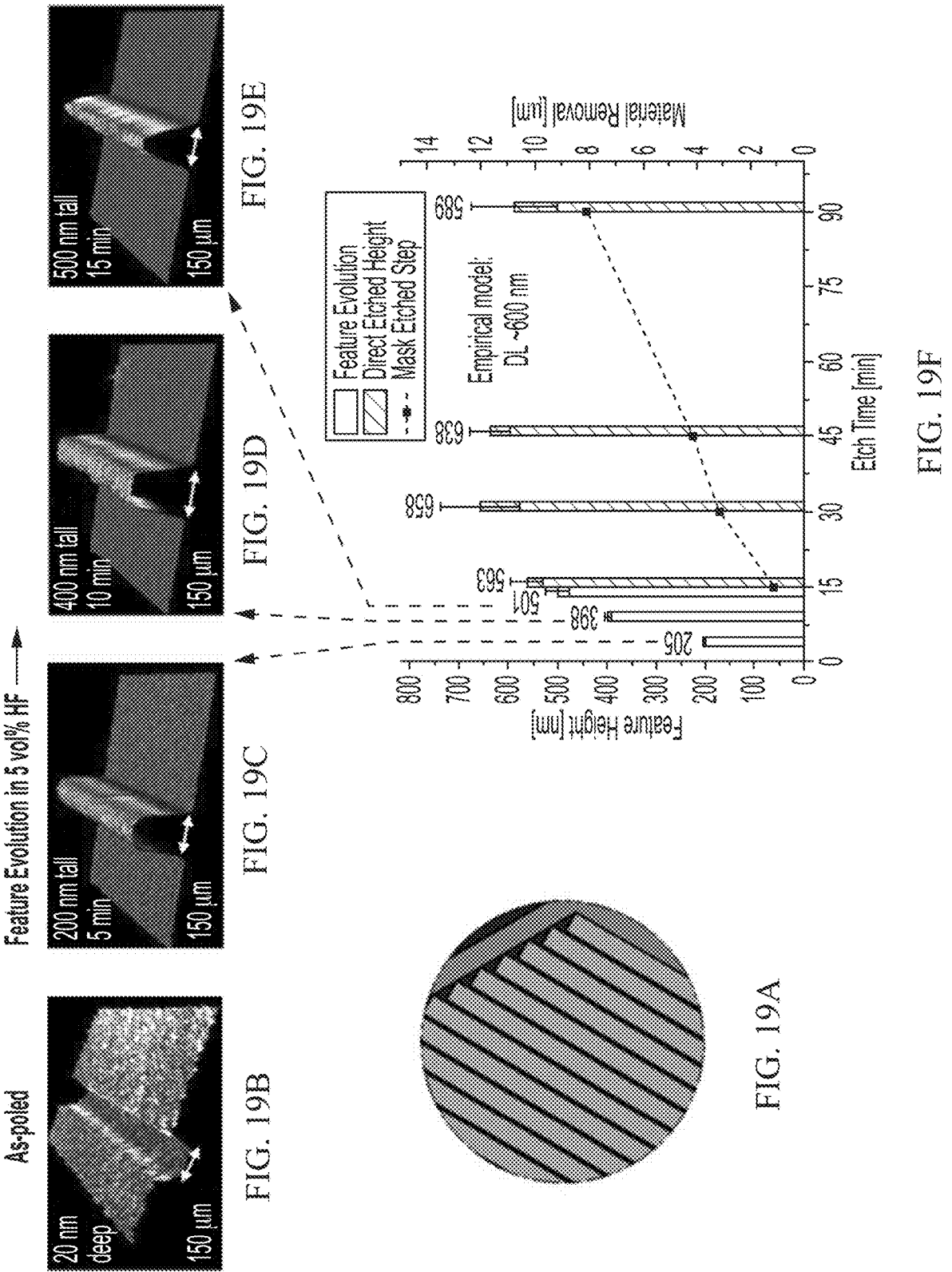
FIGS. 19A-19F present graphical data from a model simulating the evolution of a topographical feature formed initially via thermal poling and then differentially etched to further enhance the topographical feature.

FIGS. 19A-19F present graphical data from a model simulating the evolution of a topographical feature formed initially via thermal poling and then differentially etched to further define the topographical feature in a glass substrate. As shown in FIG. 19A, thermal poling was used to initially form a surface relief topography across the surface of the glass substrate. FIG. 19B illustrates the as-poled topographical feature as a depression in the surface of the glass substrate. The as-pole topographical feature has a depth of approximately 20 nm recessed into the surface. FIGS. 19C-19E illustrate a differential etching process in which the topographical feature is enhanced by exposing the glass surface to a 5 vol % hydrofluoric acid (HF) etchant. FIG. 19C shows that after 5 mins of exposure to the HF etchant, the topographical feature has transitioned from a depression into a protrusion extending from the surface of the glass substrate with a height of approximately 200 nm. The transition from depression to protrusion occurs because HF etch rate of the unpoled bulk material is faster than the HF etch rate of the poled material defining the topographical feature. FIG. 19D shows that the topographical feature continues to increase in height to about 400 nm after about 10 mins of exposure to the HF etchant, and FIG. 19E shows that the topographical feature continues to increase in height to about 500 nm after about 15 mins of exposure to the HF etchant. FIG. 19F is a chart illustrating feature height and material removal versus etch time during the evolution of the topographical feature in the model simulation.

Shown in Table 1 are the HF etch rate through unpoled bulk material, the HF etch rate through poled alkali-depleted region, and the ratio of the unpoled material HF etch rate to the poled material etch rate for each of samples 3-1 through 3-10 of Example 3. The samples each comprise a different glass composition. The samples are arranged in Table 1 from the highest ratio to the lowest ratio. The ratio can be used to estimate the approximate etch time for evolution of a topographical feature having predetermined dimensional requirements.

TABLE 1

| | Measured Etch-Rate Contrast in Samples 3-1 through 3-10 | | | |
| --- | --- | --- | --- | --- |
| | | HF Etch Rate (nm/min) | | |
| Sample | Composition | Bulk Glass | Poled Layer | Ratio Bulk:Poled |
| 3-1 | Sodium Alumino Boro Silicate | $2416^A$ | $550^A$ | 4.4X |
| 3-2 | Alkali Alumino Phospho Silicate | $755^B$ | $101\text{-}180^B$ | 4.2-7.5X |
| 3-3 | Sodium Alumino Phospho Silicate | $2793^A$ | $705^A$ | 4.0X |
| 3-4 | Sodium Alumino Silicate | $1086^A$ | $280^A$ | 3.9X |
| 3-5 | Sodium Alumino Silicate | $210^A$ | $64^A$ | 3.3X |
| 3-6 | Alkali Alumino Silicate | $716^B$ | $208\text{-}243^B$ | 3.0-3.4X |
| 3-7 | Sodium Alumino Boro Silicate | $894^A$ | $299^A$ | 3.0X |
| 3-8 | Sodium Alumino Silicate | $397^A$ | $139\text{-}150^A$ | 2.7X |
| 3-9 | Sodium Alumino Silicate | $251^B$ | $165^B$ | 1.5X |
| 3-10 | Sodium Alumino Silicate | $253^B$ | $175^B$ | 1.5X |

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected. For example, some embodiments include glass articles in which the low-and/or high-index layers are spatially commensurate with topographical features in their as-poled state. Some embodiments include glass articles that have been differentially-etched such that the topography has been enhanced/altered in a spatially-selective way relative to the initial poling treatment. Some embodiments include glass articles in which the low- and/or high-index layers are spatially commensurate with the topographical features, and the low-and/or high-index layers are remain even after differential etching to enhance the surface topography. Some embodiments include glass articles in which the surfaces have been differentially-etched but the high index/low index glass regions have been partially or completely removed (but retains its topography). In other words, some or mall of the high/low index can be etched away.

What is claimed is:

1. A glass substrate, comprising:

a first side and an opposite second side;

an alkali-containing bulk disposed between the first and second sides;

a first alkali-depleted region formed in the alkali-containing bulk on the first side, the first alkali-depleted region defining at least a portion of a first topographical feature, wherein the first topographic feature includes:

a height extending in a first direction from a base portion of the first topographical feature to an outermost portion of the first topographical feature, the first direction oriented parallel to a thickness of the glass substrate between the first and second sides, and a width extending in a second direction between at least two, spaced apart wall portions of the first topographical feature, the second direction oriented normal to the first direction, wherein each of the height and the width of the first topographical feature corresponds to a microscale dimension in range from about 1 μm to about 1000 μm;

a first ion-exchanged region formed in the alkali-containing bulk on the first side;

a second alkali-depleted region formed in the alkali-containing bulk on the second side; and a second ion-exchanged region formed in the alkali-containing bulk on the second side, wherein:

the first alkali-depleted region comprises a first thickness $t_1$;

the second alkali-depleted region comprises a second thickness $t_2$;

the first ion-exchanged region comprise a third thickness $t_3$ substantially equal to $t_1$; and the second ion-exchanged region comprises a fourth thickness $t_4$.

2. The glass substrate of claim 1, wherein the first topographical feature is a negative feature recessed in a first surface of the glass substrate on the first side.

3. The glass substrate of claim 2, wherein an exposed surface of the first alkali-depleted region defines the base portion of the topographical feature.

4. The glass substrate of claim 2, wherein the alkali-containing bulk defines one of the at least two wall portions of the first topographical feature.

5. The glass substrate of claim 2, wherein the alkali-containing bulk defines the at least two wall portions of the first topographical feature.

6. The glass substrate of claim 2, wherein the alkali-containing bulk defines a first portion of the first surface of the glass substrate into which the first alkali-depleted region is recessed, the first portion corresponding to the outermost portion of the first topographical feature.

7. The glass substrate of claim 1, wherein the first ion-exchanged region abuts the first alkali-depleted region.

8. The glass substrate of claim 1, wherein the first ion-exchanged region defines a second portion of the first surface of the glass substrate into which the first alkali-depleted region is recessed, the second portion corresponding to the outermost portion of the first topographical feature.

9. The glass substrate of claim 1, wherein the first topographical feature is a positive feature that protrudes from the alkali-containing bulk.

10. The glass substrate of claim 9, wherein the first alkali-depleted region defines the at least two wall portions of the topographical feature.

11. The glass substrate of claim 9, wherein the first alkali-depleted region defines the base portion of the first topographical feature at an interface between the first alkali-depleted region and the alkali-containing bulk.

12. The glass substrate of claim 9, wherein the first alkali-depleted region defines the outermost portion of the first topographical feature.

13. The glass substrate of claim 9, the first ion-exchanged region defining at least a portion of a second topographical feature.

14. The glass substrate of claim 13, wherein the outermost portion of the first topographical feature protrudes further away from the glass substrate than an outermost portion of the second topographical feature.

15. The glass substrate of claim 13, wherein first topographical feature abuts the second topological feature.

16. The glass substrate of claim 1, wherein the first alkali-depleted region and the second alkali-depleted region are aligned when viewed in a thickness direction oriented perpendicular to the first and second surfaces.

17. The glass substrate of claim 1, herein the first ion-exchanged region and the second ion-exchanged region are aligned when viewed in a thickness direction oriented perpendicular to the first and second surfaces.

* * * * *